United States Patent [19]

Iwata

[11] Patent Number: 6,108,708
[45] Date of Patent: *Aug. 22, 2000

[54] CONNECTION-ORIENTED NETWORK USING DISTRIBUTED NETWORK RESOURCES AND PREDETERMINED VPIS FOR FAST VC ESTABLISHMENT

[75] Inventor: Atsushi Iwata, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,712

[22] Filed: May 21, 1997

Related U.S. Application Data

[63] Continuation of application No. 08/364,186, Dec. 27, 1994, abandoned.

[30] Foreign Application Priority Data

Dec. 27, 1993 [JP] Japan .................................. 5-333433

[51] Int. Cl.[7] .......................... G06F 15/173; H04L 12/28
[52] U.S. Cl. ............................................. 709/238; 370/409
[58] Field of Search .................................. 370/399, 397, 370/409; 395/200.3, 200.68, 200.75; 709/200, 238, 245

[56] References Cited

U.S. PATENT DOCUMENTS

| | | | |
|---|---|---|---|
| 4,641,302 | 2/1987 | Miller | 370/60 |
| 4,907,220 | 3/1990 | Rau et al. | 370/399 |
| 5,408,469 | 4/1995 | Opher et al. | 370/60.1 |
| 5,432,777 | 7/1995 | Le Boudec et al. | 370/397 |
| 5,517,497 | 5/1996 | Le Boudec et al. | 370/399 |
| 5,600,643 | 2/1997 | Robrock, II | 370/399 |
| 5,694,547 | 12/1997 | Subramanian et al. | 395/200.11 |

*Primary Examiner*—John A. Follansbee
*Attorney, Agent, or Firm*—Foley & Lardner

[57] ABSTRACT

In a connection-oriented network, a normal signaling packet is sent from a source user to the network. A first virtual path identifier (VPI) is determined at a first node of the network according to a destination address in the packet, and the first VPI is inserted into the packet, and forwarded to the second node, where it determines a second VPI according to the packet's destination address, adds the second VPI to the first VPI in the packet to produce a source route, and forwards the normal signaling packet to a destination user. The destination user returns an acknowledgment (ACK) packet to the source user, containing the source route. In response to the ACK, the source user stores the source route contained in the packet into a source route table, and selects an initial VPI and an initial virtual channel identifier (VCI) from a copy of network resource, and sends a fast signaling packet, containing the source route, the initial VPI and VCI. At the first node, a first VCI is selected according to the first VPI in the source route of the fast signaling packet, the initial VPI/IVCI in the packet are mapped to the first VPI/VCI, and the initial VCI in the packet is overwritten with the first VCI, and the packet is forwarded to the second network node, where a second VCI is selected according to the second VPI in the source route of the packet, and the first VPI/VCI in the packet are mapped to the second VPI/VCI, and the first VCI in the packet is overwritten with the second VCI, and the packet is forwarded to the destination user.

20 Claims, 13 Drawing Sheets

NETWORK NODE

NETWORK NODE

US 6,108,708

CONNECTION-ORIENTED NETWORK USING DISTRIBUTED NETWORK RESOURCES AND PREDETERMINED VPIS FOR FAST VC ESTABLISHMENT

This application is a continuation of application Ser. No. 08/364,186, filed Dec. 27, 1994, now abandoned.

BACKGROUND OF THE INVENTION

1. Field of the Invention

The present invention relates generally to connection-oriented communications networks, and more specifically to a signaling technique for establishing a virtual connection in a network such as asynchronous transfer mode (ATM) network.

2. Description of the Related Art

Studies on signaling protocols for ATM networks were undertaken by international bodies such as Working Party XI/6 of CCITT Study Group XI and ATM Forum, and proposals were made in the form of draft standards such as Draft Text for Q.93B, pages 1 to 14 and Signaling Specification Draft, pages 14 to 20, respectively.

While the proposals secure availability for many types of variable length signaling message and provide such flexibility that signal units can be inserted into any location of a message, a substantial amount of time will be taken to establish a virtual connection due to increased processing time and increased propagation delays. Specifically, each network node is required to examine the called party address contained in the signaling message to determine the link to the next hop. When the route extends to the desired called party address, the signaling is made on the basis of the called party subaddress contained in the message. As a result, the processing time taken by each node of the network increases, and the connection establishment time will be increased significantly with an increase in the number of network nodes.

SUMMARY OF THE INVENTION

It is therefore an object of the present invention to provide a signaling technique for a connection-oriented communications network capable of fast connection establishment.

According to a first aspect of the present invention, there is provided a connection-oriented communications network comprising a user terminal including a source route table for storing therein a source route corresponding to a destination user terminal, and means for transmitting a signaling packet containing the source route to the network, the source route including a series of route records each containing routing information including a virtual path identifier (VPI), and a plurality of interlinked network nodes, each of the nodes including a translation table and means for receiving the signaling packet, reading a VPI from a corresponding one of the route records of the signaling packet and mapping incoming and outgoing routing information in the translation table in accordance with the read VPI.

According to a second aspect, the present invention provides a connection-oriented communications network comprising a user terminal including a source route table for storing therein a series of reference numbers corresponding to a destination user terminal, means for transmitting a signaling packet containing the series of reference numbers to the network, each of the reference numbers representing routing information containing a virtual path identifier (VPI), and a plurality of interlinked network nodes, each of the nodes including a translation table, and means for receiving the signaling packet, translating a corresponding one of the reference numbers in the received packet to a VPI, and mapping incoming and outgoing routing information in the translation table in accordance with the translated VPI.

According to a third aspect, the present invention provides a connection-oriented communications network comprising a user terminal including means for transmitting a signaling packet to the network, and a plurality of interlinked network nodes, each of the nodes including means for receiving the packet, a translation table, a source route table for storing therein, in correspondence to the destination address in the received packet, a source route containing a series of route records each containing a virtual path identifier (VPI), each of the network nodes reading a VPI from a corresponding one of the route records of the signaling packet and mapping incoming and outgoing routing information in the translation table in accordance with the read VPI.

According to a fourth aspect, the present invention provides a connection-oriented communications network comprising a user terminal including a first source route table for storing therein a reference number corresponding to a destination address and means for transmitting a signaling packet to the network, the signaling packet containing the destination address and the reference number, and a plurality of interlinked network nodes, each of the nodes including means for receiving the packet, a translation table, a second source route table for storing therein, in correspondence to the destination address in the received packet, a source route containing a series of route records each containing a virtual path identifier (VPI), each of the network nodes translating the reference number in the received packet to the source route in the second source route table, reading a VPI from a corresponding one of the route records of the source route, and mapping incoming and outgoing routing information in the translation table in accordance with the read VPI.

According to a fifth aspect, the present invention provides a method for a connection-oriented communications network including first and second user terminals and first and second interlinked network nodes. The method comprises the steps of:

a) sending a normal signaling packet from the first user terminal to the network, the normal signaling packet containing a destination address of the second user terminal;

b) receiving the normal signaling packet at the first network node, determining a first virtual path identifier (VPI) according to the destination address in the packet, inserting the first VPI into the received signaling packet, and forwarding the packet to the second network node;

c) receiving the normal signaling packet at the second network node, determining a second VPI according to the destination address in the packet, adding the second VPI to the first VPI in the packet to produce a source route, and forwarding the packet to the second user terminal;

d) responsive to the normal signaling packet from the second network node, sending an acknowledgment packet from the second user terminal back to the first user terminal via the second and first network nodes, the acknowledgment packet containing the source route;

e) receiving the acknowledgment packet at the first user terminal and storing the source route contained therein into a source route table;

f) selecting, at the first user terminal, an initial VPI and an initial virtual channel identifier (VCI) from a copy of network resource, sending a fast signaling packet from the first user terminal, the fast signaling packet containing the stored source route, and the initial VPI and the initial VCI;

g) receiving the fast signaling packet at the first network node, selecting a first VCI according to the first VPI in the source route of the packet, mapping the initial VPI and the initial VCI in the packet to the first VPI and the selected first VCI, rewriting the initial VCI in the packet with the first VCI, and forwarding the packet to the second network node as a new fast signaling packet; and h) receiving the new fast signaling packet at the second network node, selecting a second VCI according to the second VPI in the source route of the packet, mapping the first VPI and the first VCI in the packet to the second VPI and the second VCI, rewriting the first VCI in the packet with the second VCI, and forwarding the packet to the second user terminal.

According to a sixth aspect, the present invention provides a method for a connection-oriented communications network including first and second user terminals and first and second interlinked network nodes. The method comprises the steps of:

a) sending a normal signaling packet from the first user terminal to the network, the normal signaling packet containing a destination address of the second user terminal;

b) receiving the normal signaling packet at the first network node, determining a first virtual path identifier (VPI) according to the destination address in the packet, assigning a first reference number to the first VPI, inserting the first reference number into the received signaling packet, and forwarding the packet to the second network node;

c) receiving the normal signaling packet at the second network node, determining a second VPI according to the destination address in the packet, assigning a second reference number to the second VPI, adding the second reference number to the first reference number in the packet to produce a source route, and forwarding the packet to the second user terminal;

d) responsive to the normal signaling packet from the second network node, sending an acknowledgment packet from the second user terminal back to the first user terminal via the second and first network nodes, the acknowledgment packet containing the source route;

e) receiving the acknowledgment packet at the first user terminal and storing the source route contained therein into a source route table;

f) selecting, at the first user terminal, an initial VPI and an initial virtual channel identifier (VCI) from a copy of network resource, sending a fast signaling packet from the first user terminal, the fast signaling packet containing the stored source route, and the initial VPI and the initial VCI;

g) receiving the fast signaling packet at the first network node, translating the first reference number in the source route of the packet to the first VPI, selecting a first VCI according to the translated first VPI, mapping the initial VPI and the initial VCI in the packet to the translated VPI and the selected first VCI, rewriting the initial VPI and the initial VCI in the packet with the first VPI and the first VCI, respectively, and forwarding the packet to the second network node as a new fast signaling packet; and h) receiving the new fast signaling packet at the second network node, translating the second reference number in the source route of the packet to the second VPI, selecting a second VCI according to the translated second VPI, mapping the first VPI and the first VCI in the packet to the translated second VPI and the second VCI, rewriting the first VPI and the first VCI in the packet with the second VPI and the second VCI, respectively, and forwarding the packet to the second user terminal.

According to a seventh aspect, the present invention provides a method for a connection-oriented communications network including first and second user terminals and first and second interlinked network nodes. The method comprises the steps of:

a) selecting, at the first user terminal, an initial VPI and an initial virtual channel identifier (VCI) from a copy of network resource, sending a fast signaling packet from the first user terminal, the fast signaling packet containing a destination address of the second user terminal and the initial VPI and the initial VCI;

b) receiving the fast signaling packet at the first network node, returning a negative acknowledgment packet to the first user terminal if a source route corresponding to the destination address in the packet is not present in a source route table;

c) responsive to the negative acknowledgment packet, sending a normal signaling packet from the first user terminal to the network, the normal signaling packet containing the destination address;

d) receiving the normal signaling packet at the first network node, determining a first virtual path identifier (VPI) according to the destination address in the packet, inserting the first VPI into the received signaling packet, and forwarding the packet to the second network node;

e) receiving the normal signaling packet at the second network node, determining a second VPI according to the destination address in the packet, adding the second VPI to the first VPI in the packet to produce a source route, and forwarding the packet to the second user terminal;

f) responsive to the affirmative acknowledgment packet, sending a normal signaling packet from the first user terminal to the network, sending a connection indicating packet from the second user terminal back to the first network node, the connection indicating packet containing the source route;

g) receiving the connection indicating packet at the first network node and storing the source route contained therein into the source route table, and returning the connection indicating packet to the first user terminal;

h) if the source route is present in the source route table, selecting, at the first network node, a first VCI according to the first VPI in the source route of the fast signaling packet from the first user terminal, mapping the initial VPI and the initial VCI in the packet to the first VPI and the selected first VCI, rewriting the initial VCI in the packet with the first VCI, and forwarding the packet to the second network node as a new fast signaling packet; and j) receiving the new fast signaling packet at the second network node, selecting a second VCI according to the second VPI in the source route of the packet, mapping the first VPI and the first VCI in the packet to the second VPI and the second VCI, rewriting the first VCI in the packet with the second VCI, and forwarding the packet to the second user terminal.

According to an eighth aspect, the present invention provides a method for a connection-oriented communications network including first and second user terminals and first and second interlinked network nodes. The method comprises the steps of:

a) determining whether a reference number corresponding to a destination address of the second user terminal are present in a first source route table;

b) if the reference number is not present, sending a normal signaling packet from the first user terminal to the network, the normal signaling packet containing a destination address of the second user terminal;

c) if reference numbers is present, selecting an initial VPI and an initial virtual channel identifier (VCI) from a copy of network resource, sending a fast signaling packet from the first user terminal, the fast signaling packet containing the stored reference number, the initial VPI and the initial VCI;

d) receiving the normal signaling packet at the first network node, determining a first virtual path Identifier (VPI) according to the destination address in the packet, inserting the first VPI into the received signaling packet, and forwarding the packet to the second network node;

e) receiving the normal signaling packet at the second network node, determining a second VPI according to the destination address in the packet, adding the second VPI to the first VPI in the packet to produce a source route, and forwarding the packet to the second user terminal;

f) responsive to the normal signaling packet from the second network node, sending an acknowledgment packet from the second user terminal back to the first network node via the second and first network, the acknowledgment packet containing the source route;

g) receiving the acknowledgment packet at the first network node and storing the source route contained therein into a second source route table and assigning the reference number to the source route;

h) receiving, at the first network node, the fast signaling packet from the first user terminal, translating the reference number in the received packet to the source route, selecting a first VCI according to the first VPI in the translated source route, mapping the initial VPI and the initial VCI in the packet to the first VPI and the selected first VCI, rewriting the initial VPI and the initial VCI in the packet with the first VPI and the first VCI, respectively, inserting the source route in the packet, and forwarding the packet to the second network node as a new fast signaling packet; and i) receiving the new fast signaling packet at the second network node, selecting a second VCI according to the second VPI in the source route of the packet, mapping the first VPI and the first VCI in the packet to the second VPI and the second VCI, rewriting the first VPI and the first VCI in the packet with the second VPI and the second VCI, respectively, and forwarding the packet to the second user terminal.

To reduce the time between transmission of a signaling packet and transmission of a data message, any of the methods according to the fifth to the eighth aspects further comprises the step of sending a data message immediately following the sending of a fast signaling packet from the first user terminal.

BRIEF DESCRIPTION OF THE DRAWINGS

The present invention will be described in further detail with reference to the accompanying drawings, in which.

DETAILED DESCRIPTION

Figure 1:
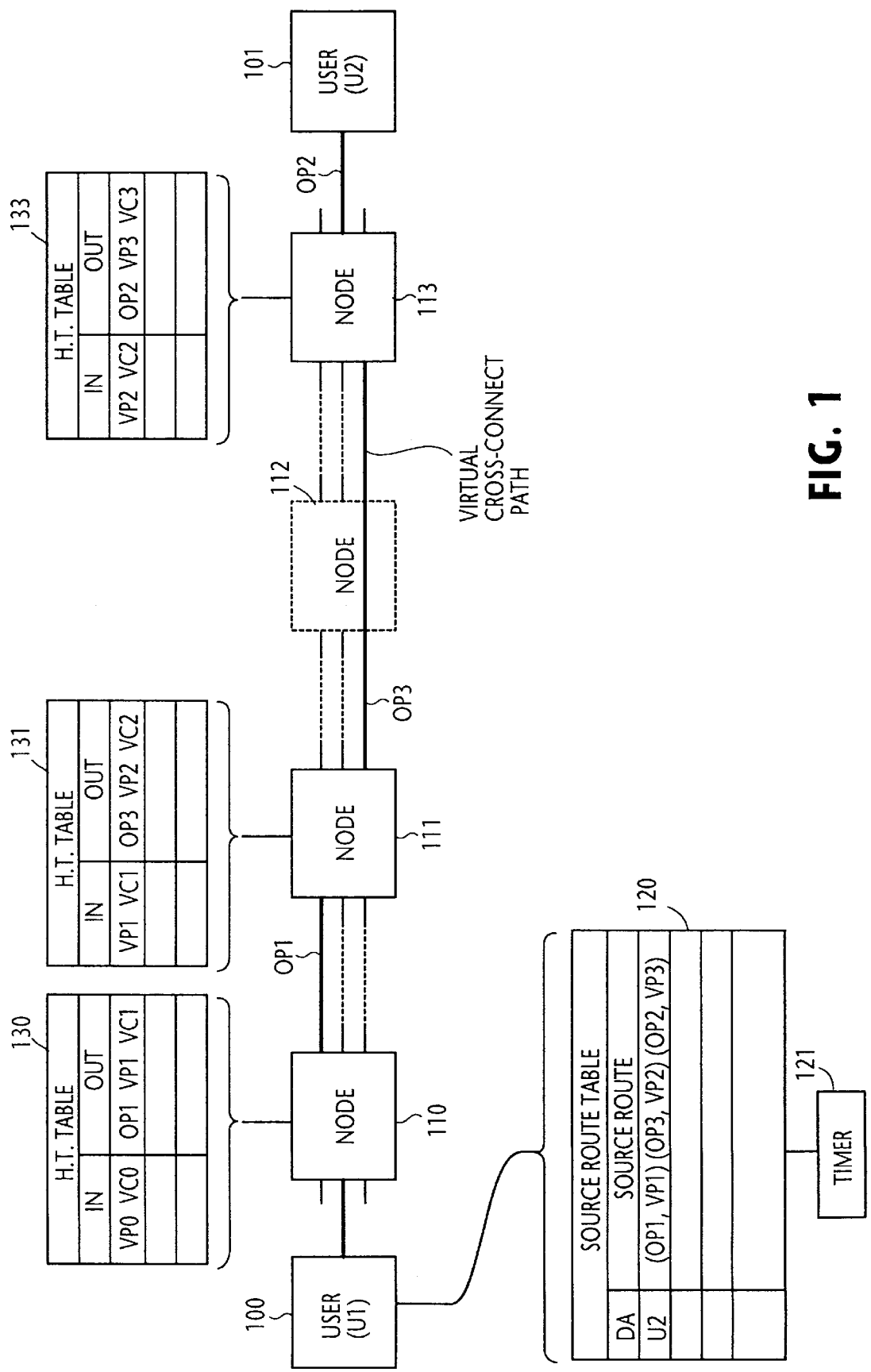
FIG. 1 is a block diagram of an ATM network according to a first embodiment of the present invention.

Referring now to FIG. 1, there is shown an ATM (asynchronous transfer mode) network according to a first embodiment of the present invention. The network includes a plurality of nodes, or ATM switches 110, 111, 112 and 113 interconnected by transmission lines. The nodes 111 and 113 are connected by virtual cross-connect paths via node 112. Each node includes a header translation table 130 having incoming entries for storing input port numbers IP, incoming VPIs and incoming VCIs, and outgoing entries for storing output port numbers OP, outgoing VPIs and outgoing VCIs. User terminals 100 and 101 are connected respectively to the endpoint nodes 110 and 113, respectively. Note that nodes 111 and 113 are interconnected by a virtual path (VP) cross-connect system located at node 112. VCI (virtual channel identifier) establishment is not performed by the intermediate node 112. It is assumed that user terminals 100 and 101 are source and destination terminals, respectively. The source user terminal 100 is provided with a source route table 120 which is a cache memory for mapping destination addresses with corresponding "source routes". A timer 121 is provided for measuring the time lapse from the instant a source route of a given destination is stored into the table 120 and erases it when the measured time of the source route exceeds a predetermined time-out period. This source route is created by having each node on the route add an output port number and a VPI to the packet as it propagates through the network. The source route of a signaling packet is therefore a series of concatenated route records of the nodes through which the packet has traveled. As will be described, a source route is completed at the destination endpoint node, which transmits the source route data to the destination user where it is user inserted into an acknowledgement packet and transmitted back to the source.

According to the present invention, the VPI/VCI resource of the network is distributed among user terminals and network nodes so that each user terminal and each network node has a copy of the network resource. Therefore, each user terminal has the ability to quickly select a VPI/VCI from its own network resource. Each network node has its own pool of VPIs/VCIs which are reserved for each input port and each output port of the node. When the node receives a signaling packet, the network node makes a search through the pool of reserved VPIs/VCIs on a hardware basis.

Figure 2:
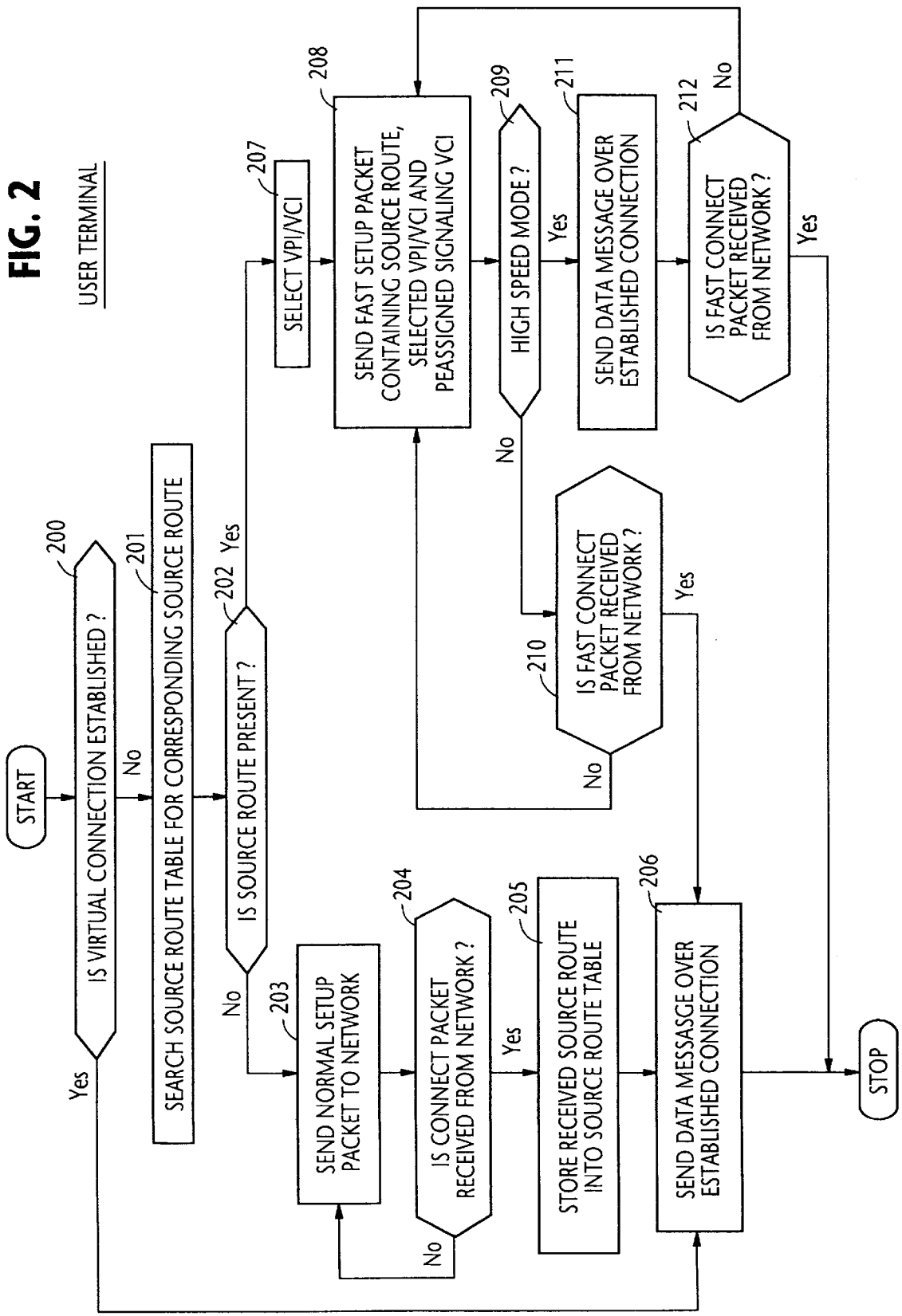
FIG. 2 is a flowchart of the operation of a user terminal of the first embodiment.
Figure 3:
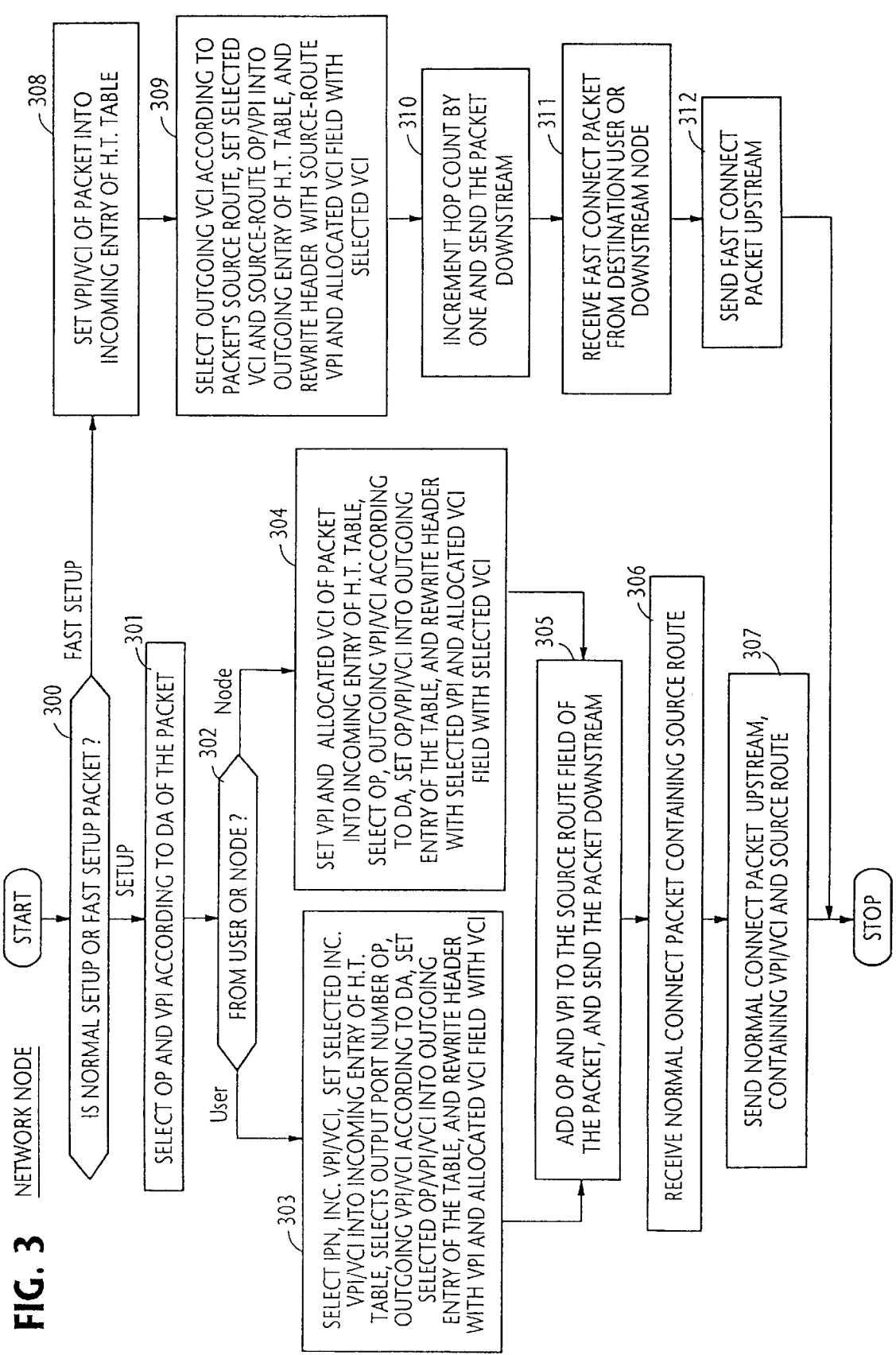
FIG. 3 is a flowchart of the operations of a network node of the first embodiment.

According to the first embodiment of the present invention, the source user terminal and each network node provide VCC (virtual channel connection) establishment according to the flowcharts of FIGS. 2 and 3, respectively. In FIG. 2, the operation of source user terminal 100 begins with decision step 200 which determines whether or not a virtual connection (VC) has been established. If no virtual connection has been established, control proceeds to step 201 to make a search through the source route table 120 for a source route corresponding to the destination address U2 and proceeds to step 202 to determine if there is one. If the source route is not present, control branches at step 202 to step 203 to send a normal SETUP packet to the network, containing the destination address DA using the protocols set by the CCITT Q.93B Recommendation. Exit then is to step 204 to check to see If a normal CONNECT packet is received from the network within a specified period following the transmission of the signaling packet. If not, control returns to step 203 to resend the normal SETUP packet. If the normal CONNECT packet is received from the network, the source user terminal reads the source route data from the received packet and stores it into the source route table 120 (step 205). At step 206, the source user now transmits a data message to the network over the established virtual connection.

If a virtual connection is established already when the source user has a message to transmit, control branches at step 200 to step 206 to send a data packet to the destination over the established connection.

If the source route is stored in the source route table 120, the decision at step 202 is affirmative, and the source user selects VPI and VCI all by itself from its own network resource (step 207) and sends a FAST SETUP packet to the network, containing the selected VPI/VCI in the allocated VPI/VCI field of the packet for message transmission, the source route data stored in the source route table 120 corresponding to the destination address and a header containing the selected VPI and a VCI which is preassigned for signaling purposes (step 208).

Exit then is to step 209 to determine whether or not the source user terminal is in a high speed mode. If the source user is not in the high speed mode, control branches at step 209 to step 210 to check to see if a FAST CONNECT packet is received from the network. If the answer is negative at step 210, control returns to step 208 to resend the FAST SETUP packet, and if the answer is affirmative, control proceeds to step 206 to send a data packet, and control terminates the routine.

If the source user terminal is in a high speed mode, control branches at step 209 to step 211 to send a data message over the established connection and waits for the reception of a FAST CONNECT packet from the destination (step 212). If it fails to receive the FAST CONNECT packet within a specified period following the transmission of the fast signaling packet, control returns to step 208 for retransmission. If a FAST CONNECT packet is received at step 212, the source user terminal terminates its operation until the next data packet is sent.

In FIG. 3, the operation of a network node that receives a signaling packet begins with decision step 300 to determine whether the received packet is a normal SETUP packet or a FAST SETUP packet. If the received packet is a normal SETUP packet, control exits to step 301 to select an output port number OP and a VPI from the header translation table of the node according to the destination address contained in the packet. Exit then is to step 302 to check to see if the packet is received direct from a user terminal or from an upstream node by examining the type of interfaces being used. If the packet is received via a user-network interface (UNI), control branches at step 302 to step 303 to select an incoming port number, an incoming VPI and an incoming VCI from a list of resource data reserved for the node and set the selected incoming VPI and VCI into an incoming entry of the header translation table. The node further proceeds to select an output port number OP, an outgoing VPI and an outgoing VCI according to the destination address and set the selected OP and outgoing VCI and VPI into an outgoing entry of the header translation table corresponding to the incoming entry. The node then rewrites the VPI value of the packet's header with the selected outgoing VPI and sets the selected outgoing VCI into the allocated-VCI field of the packet.

If the packet is received from an upstream node, control exits to step 304 to set the VPI of the packet's header and the VCI of the allocated VCI field of the packet into an incoming entry of the header translation table, select an output port number, outgoing VPI and outgoing VCI according to the destination address, set them into an outgoing entry of the header translation table corresponding to the incoming entry, and rewrite the VPI value of the header of the packet with the selected outgoing VPI.

Following step 303 or 304, control exits to step 305 to add the output port number OP and the outgoing VPI to the source route field of the packet and sends the packet downstream, The node then receives a normal CONNECT packet containing a source route from the destination user or a downstream node (step 306) and it sends the packet upstream, containing the VPI/VCI to be used by the source user (step 307).

If the packet is determined to be a FAST SETUP packet at step 300, control proceeds to step 308 to set the VPI of the packet's header and the message transmission VCI into the incoming entry of the header translation table. At step 309, control reads an output port number OP and a VPI from the source route of the packet which are specified by the hop count value and selects an outgoing VCI according to the read VPI and sets the selected VCI and the source-route's OP and VPI into the outgoing entry of the header translation table and rewrites the VPI of the header and the VCI of the allocated VCI field of the packet with the source-route VPI and the selected VCI, respectively.

At step 310, the hop count of the packet is incremented by one and the packet is sent downstream. The node then receives a FAST CONNECT packet from the destination user or a downstream node (step 311) and it sends the packet upstream (step 312).

Figure 4A:
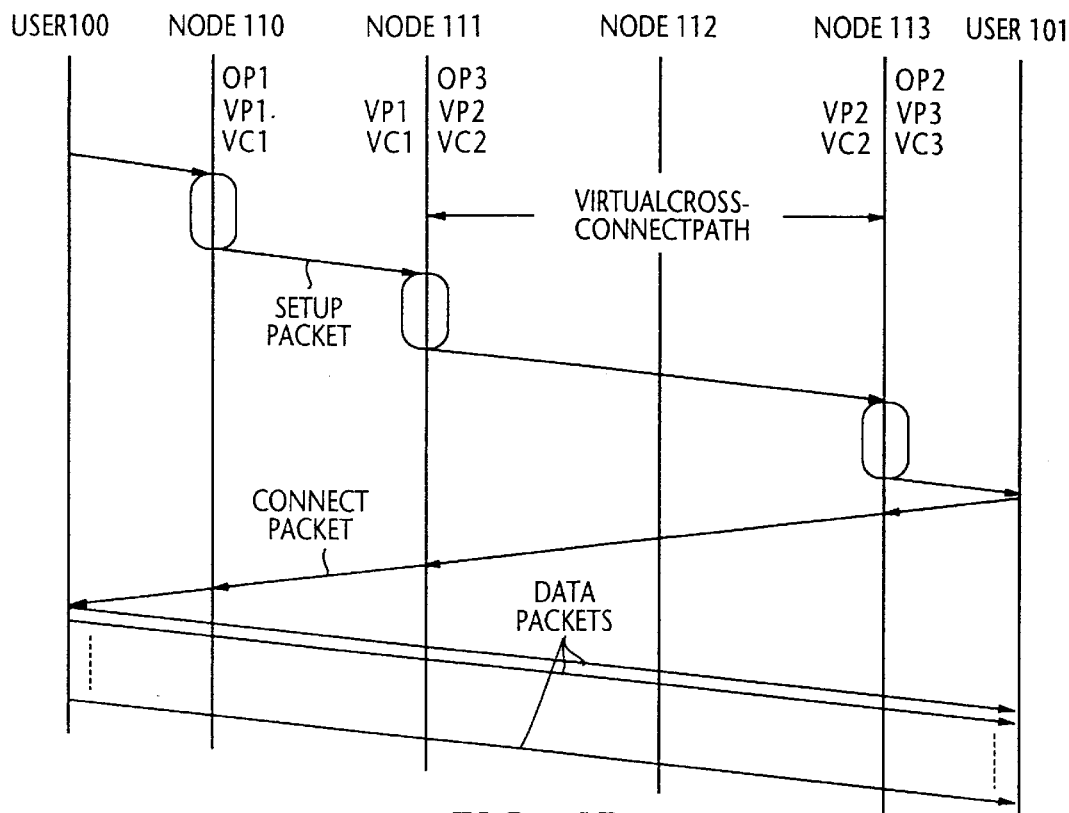
FIGS. 4A, 4B and 4C are diagrams useful for describing the operations of the first embodiment.

Assume that the user terminal 100 wishes to send a message to the user terminal 101 using a normal SETUP packet. Initially, the decision at step 202 is negative, and source user 100 sends a normal SETUP packet to the network, which is received by each successive node along the route. Each node examines the destination address in the packet and selects an output port number OP, a VPI, and an appropriate VCI for message transmission, and sets the OP and VPI values into the packet as the route records of the nodes, and sets the VPI into the packet's header and the VCI into the allocated VCI field of the packet and forwards the packet to a downstream node where a new route record is added to the previous record routes. As illustrated in FIG. 4A, OP and VPI values (OP1, VP1), (OP3, VP2), (OP2, VP3) are successively set up in the header translation tables of nodes 110, 111 and 113 and added to the packet as their route records, producing a source route (OP1, VP1), (OP3, VP2), (OP2, VP3). At the intermediate node 112, the VPI value in the packet's header is rewritten according to a value preassigned to the cross-connect path. At the destination terminal 101, the source route data is inserted into a normal CONNECT packet, and the packet is sent back from the destination user to the source user terminal 100, signaling successful receipt of the SETUP packet in response to the normal CONNECT packet, the source user terminal saves the source route data into the source route table 120 (step 205) and sends a data message over the established virtual connection (step 206).

After transmission of data packets, the virtual connection will be cleared off. However, if the time-out period of timer 121 is not expired, the source route for the destination user terminal 101 remains in the source route table 120 at the source user. When the user terminal 100 attempts to establish a virtual connection to the user terminal 101 again, the decision at step 202 is affirmative, and the source user selects a VPI/VCI from the its own VPI/VCI resource (step 207) and sets the stored source route into a packet and sends it as a FAST SETUP packet to the network (step 208). If the source terminal is in a low speed mode, it waits for the return of a FAST CONNECT packet acknowledging receipt of the FAST SETUP packet (step 210) before it sends a data message over the established connection (step 206).

Figure 4B:
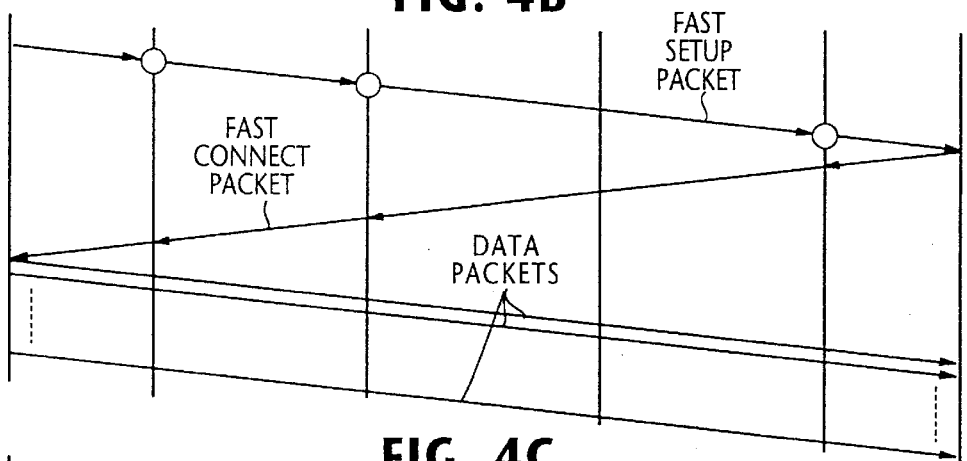

In response to the FAST SETUP packet, each node examines the source route of the packet, selects an outgoing VCI according to the OP and VPI in the source route, sets the output port number OP and the VPI in the source route into the outgoing entry of the header translation table, sets the selected VCI into the allocated VCI field of the packet and the source-route VPI into the header, and forwards the packet to the next node. As illustrated in FIG. 4B, VPI/VCI establishment is performed at nodes 110, 111 and 113 using the source route data (OP1, VP1), (OP3, VP2), (OP2, VP3). Because of the use of the established OP/VPI routing information, the processing time of each node is reduced significantly and the amount of time the source user is required to wait for acknowledgment is reduced.

Figure 5:
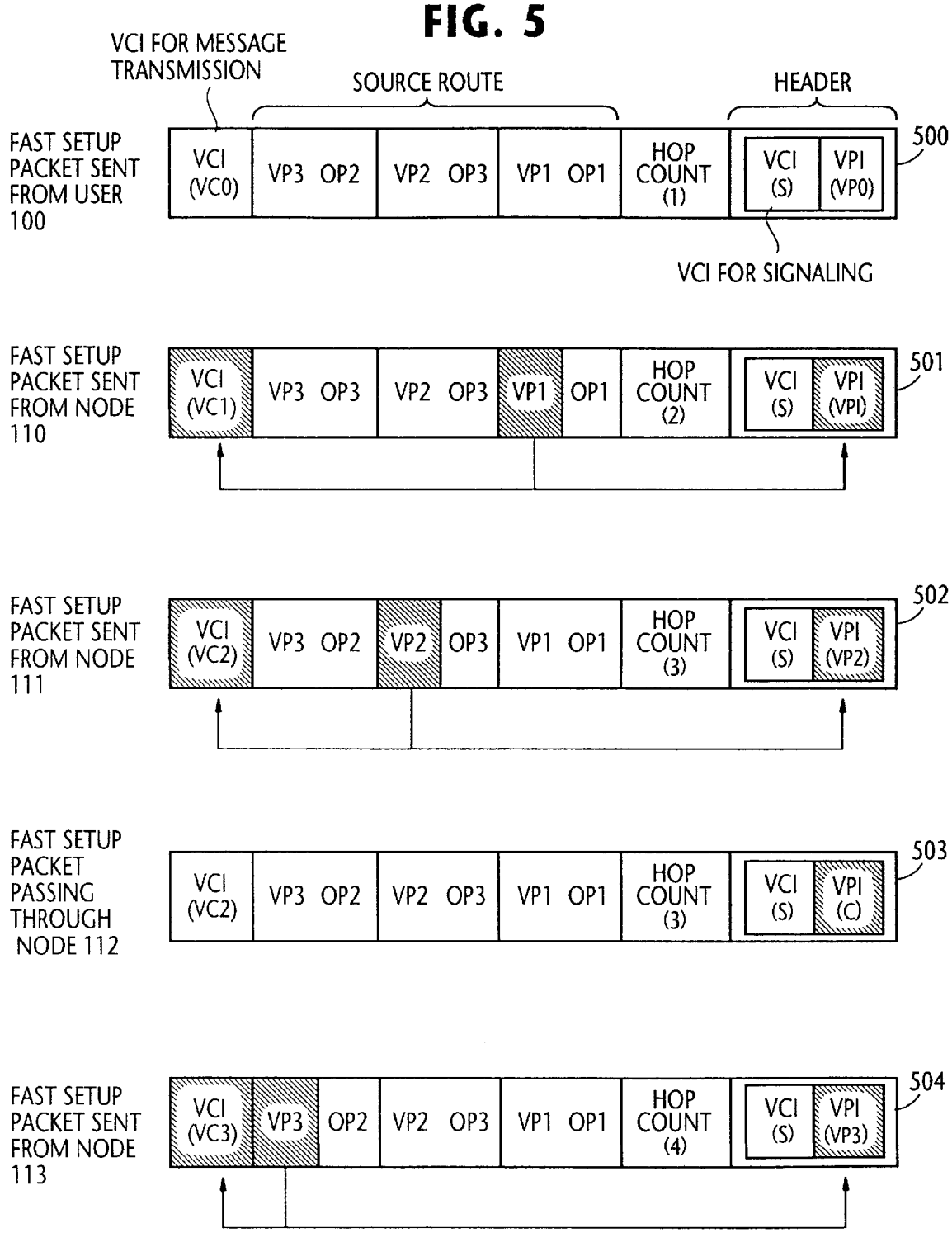
FIG. 5 is an illustration of the contents of fast signaling packets used in the present invention.

More specifically, when the source user 100 sends a FAST SETUP packet 500, it selects a message-transmission VCI=VC0 and a VPI=VP0 according to the destination address from its own network resource, inserts the source route data of the destination into the source route field of the packet, as shown in FIG. 5, sets the hop count to 1, sets the selected VC0 into the allocated field of the packet, and sets the selected VP0 and a preassigned signaling VCI=(S) into the header.

In response to the packet 500, the node 110 sets the VP1 and VC1 of the packet into the incoming entry of translation table 130 (see FIG. 1), reads OP1 and VP1 from the source route which are located in a route record position specified by hop count 1, selects VC1 as an outgoing VCI according to OP1 and VP1 and sets OP1, VC1 and VP1 into the outgoing entry of the translation table 130 and sets the VCI into the allocated VCI field of the packet and the VP1 into the packet's header (step 309), and increments the hop count to 2 and sends the modified packet as a FAST SETUP packet 501.

In response to the packet 501, the node 111 sets the VP1 and VC1 of the packet into the incoming entry of translation table 131 (FIG. 1), reads OP3 and VP2 from a route record of the source route of the packet specified by hop count 2, selects VC2 as an outgoing VCI according to OP3 and VP2, and sets OP3, VP2 and VC2 into the outgoing entry of the translation table 131 and rewrites the header with VP2 and the allocated VCI field of the packet with VC2, increments the hop count to 3 and sends the modified packet as a FAST SETUP packet 502.

The intermediate node 112 located in the virtual cross-connect path rewrites the VPI of the header with a preassigned VPI=C value and forwards the packet 502 over the cross-connect path to node 113 as a packet 503.

Figure 4C:
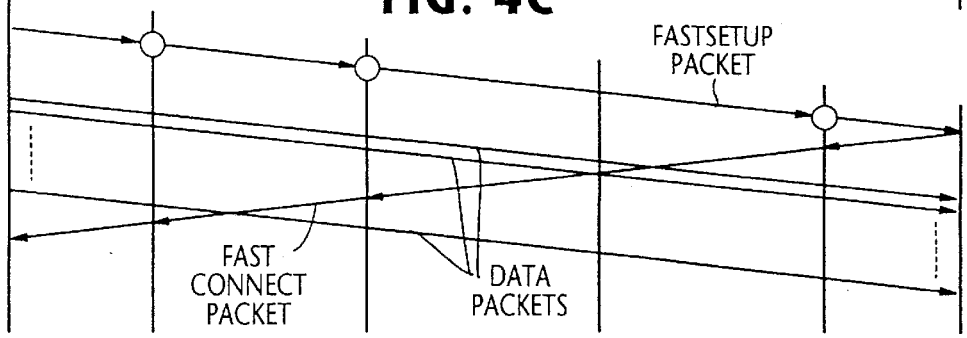

On receiving the packet 503, node 113 sets the VP2 and VC2 of the packet into the incoming entry of translation table 133 (FIG. 1), reads OP2 and VP3 specified by hop count 3, selects VC3 according to OP2/VP3, and sets user inserted into an acknowledgement packet and.OP2, VP3 and VC3 into the outgoing entry of the translation table 133, rewrites the packet's header with VP3 and the allocated VCI field with VC3, increments the hop count to 4, and sends the modified packet as a FAST SETUP packet 504 to the destination 101. Since the source user has its own VPI/VCI resource and the ability to select a VPI/VCI (step 207) and each network node has its own pool of VPIs/VCIs which is searched on a hardware basis in response to a signaling packet, a virtual connection can be established with a high probability of success. Therefore, the source user is not necessary to wait for acknowledgment to send a data message. Furthermore, if the source user terminal is operating in a high speed mode, the decision at step 209 (FIG. 2) is affirmative, and the user 110 sends a data message to the network without waiting for an acknowledgment packet from the destination as illustrated in FIG. 4C. If the VC establishment should fail (step 212), the FAST SETUP packet will be retransmitted, followed by the retransmission of data message (steps 208, 209, 211).

Additionally, the source route carried by the FAST SETUP signaling packet allows each successive node to use the output port number and a VPI to select an appropriate VCI. Since the virtual path identifier (VPI) is an identifier given to a bundle of multiplexed virtual channels (VC), the selection of a VCI using a VPI is the process of selecting one of VCI's belonging to that VPI. Therefore, the present invention significantly reduces the processing time of each network node, and hence there is a reduction in the overall propagation time of the signaling packet.

Figure 6:
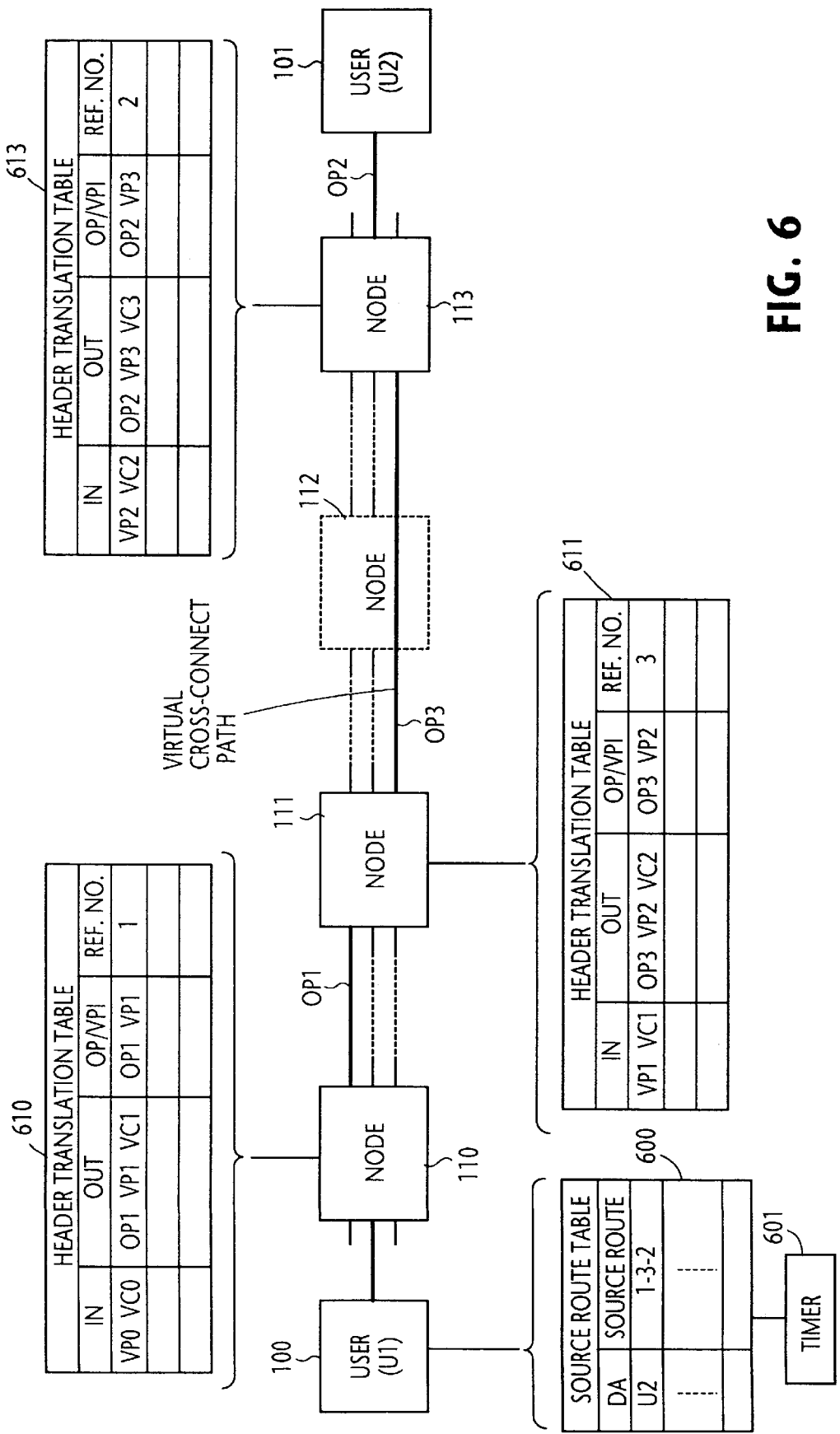
FIG. 6 is a block diagram of an ATM network according to a second embodiment of the present invention.

To facilitate multivendor applications, it is advantageous that the source route data for each destination be represented by a reference number in each network node. Therefore, the source user receives and sends a source route in the form of a series of such reference numbers, instead of the OP/VPI combination. This feature is provided by a second embodiment of this invention illustrated in FIG. 6. In this embodiment, the user terminal 100 is provided with a source route table 600 for mapping destination addresses with corresponding sequences of reference numbers and a timer 601 that provides a time-out action for each entry of the table 600. Network nodes 110, 111 and 113 are provided with header translation tables 610, 611 and 613, respectively, for mapping the OP/VPI combination for each destination entry with a locally unique reference number. In the illustrated example, the OP1/VP1 combination at node 110 for the outgoing port OP1 is represented by reference number "1" and mapped in the header translation table 610, and the OP3/VP2 combination at node 111 for the outgoing port OP3 is represented by reference number "3" and mapped in the header translation table 611. Likewise, the OP2/VP3 combination at node 113 for the outgoing port OP2 is represented by reference number "2" and mapped in the header translation table 613.

Figure 7:
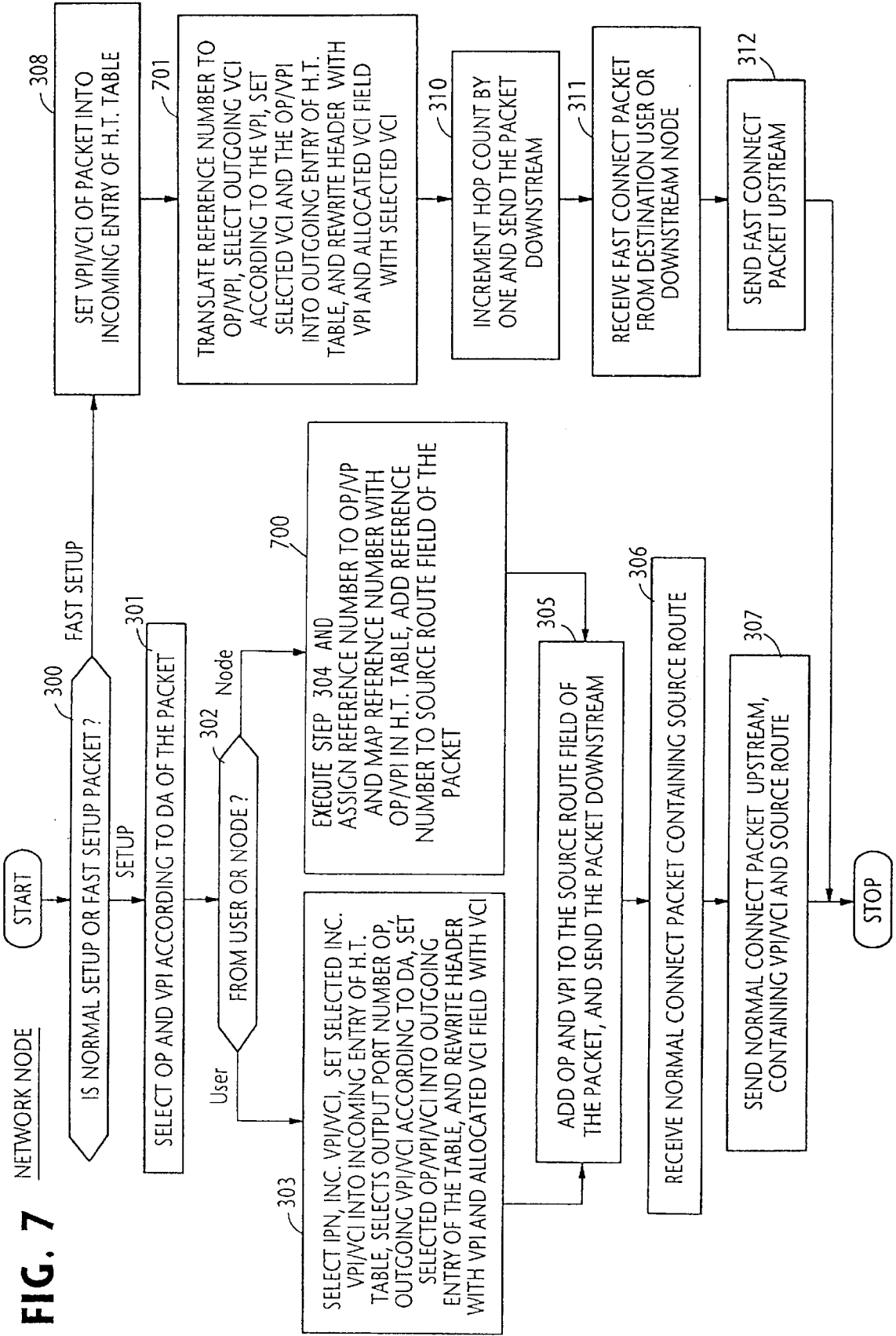
FIG. 7 is a flowchart of the operation of a network node of FIG. 6.

According to the second embodiment, the operation of the source user terminal 100 proceeds in accordance with the flowchart of FIG. 2 as in the case of the first embodiment, and the operation of each network node proceeds according to a flow chart shown in FIG. 7 which differs from the flowchart of FIG. 3 in that it includes step 700 in addition to step 304 of FIG. 3 and step 701 instead of step 309 of FIG. 3. At step 700, a reference number is assigned to the combination of OP/VPI that is set in the outgoing entry of the header translation table of each node. The assigned reference number is mapped with the OP/VPI in the header translation table and the reference number is set into the source record field of the normal SETUP packet, which is subsequently sent downstream. Thus, the source route field of the signaling packet contains a series of reference numbers concatenated at each successive node. This series of reference numbers is contained in the normal CONNECT packet at the destination user and transmitted back to the source user, which saves the concatenated reference numbers into the appropriate destination entry of source route table 120. At step 701 that follows step 308 of FIG. 3, the reference number contained in the FAST SETUP packet is translated to OP/VPI, and an outgoing VCI is selected according to the translated VPI, and the selected VCI and the OP/VPI are set in the outgoing entry of the header translation table, and the VPI in the packet's header is overwritten with the translated VPI and the VCI in the allocated VCI field of the packet is overwritten with the selected VCI. Step 701 is then followed by step 310 of FIG. 3 for incrementing the hop count by one and the packet is forwarded downstream.

Figure 8:
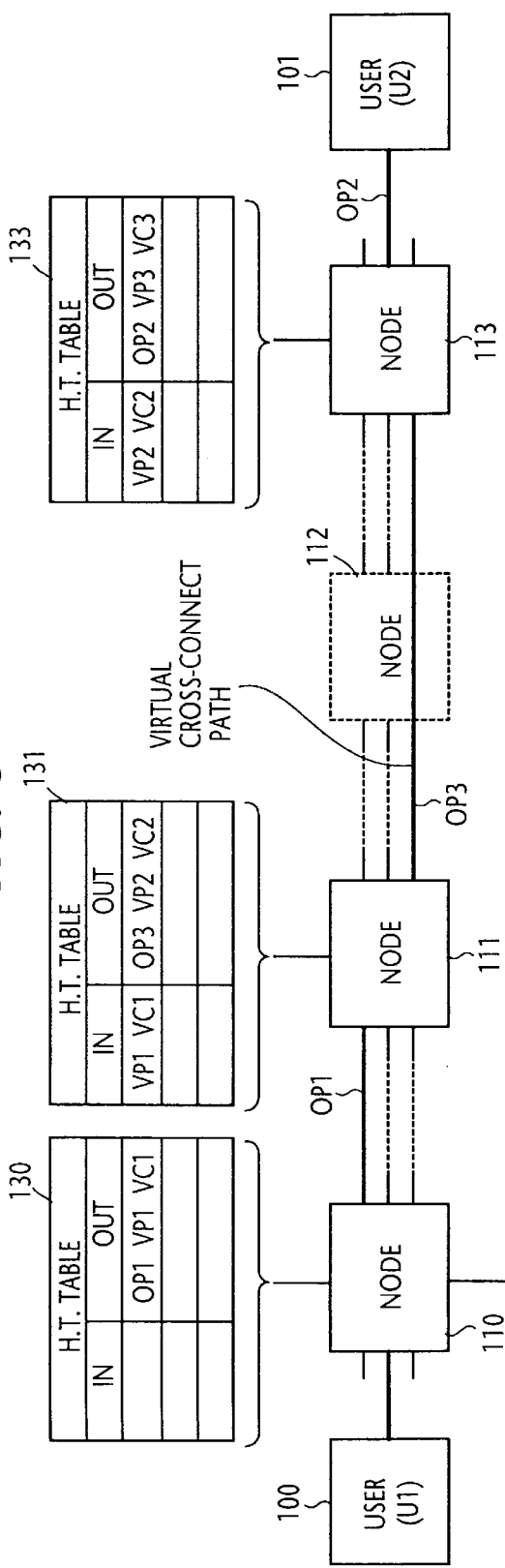
FIG. 8 is a block diagram of an ATM network according to a third embodiment of the present invention.
Figure 9:
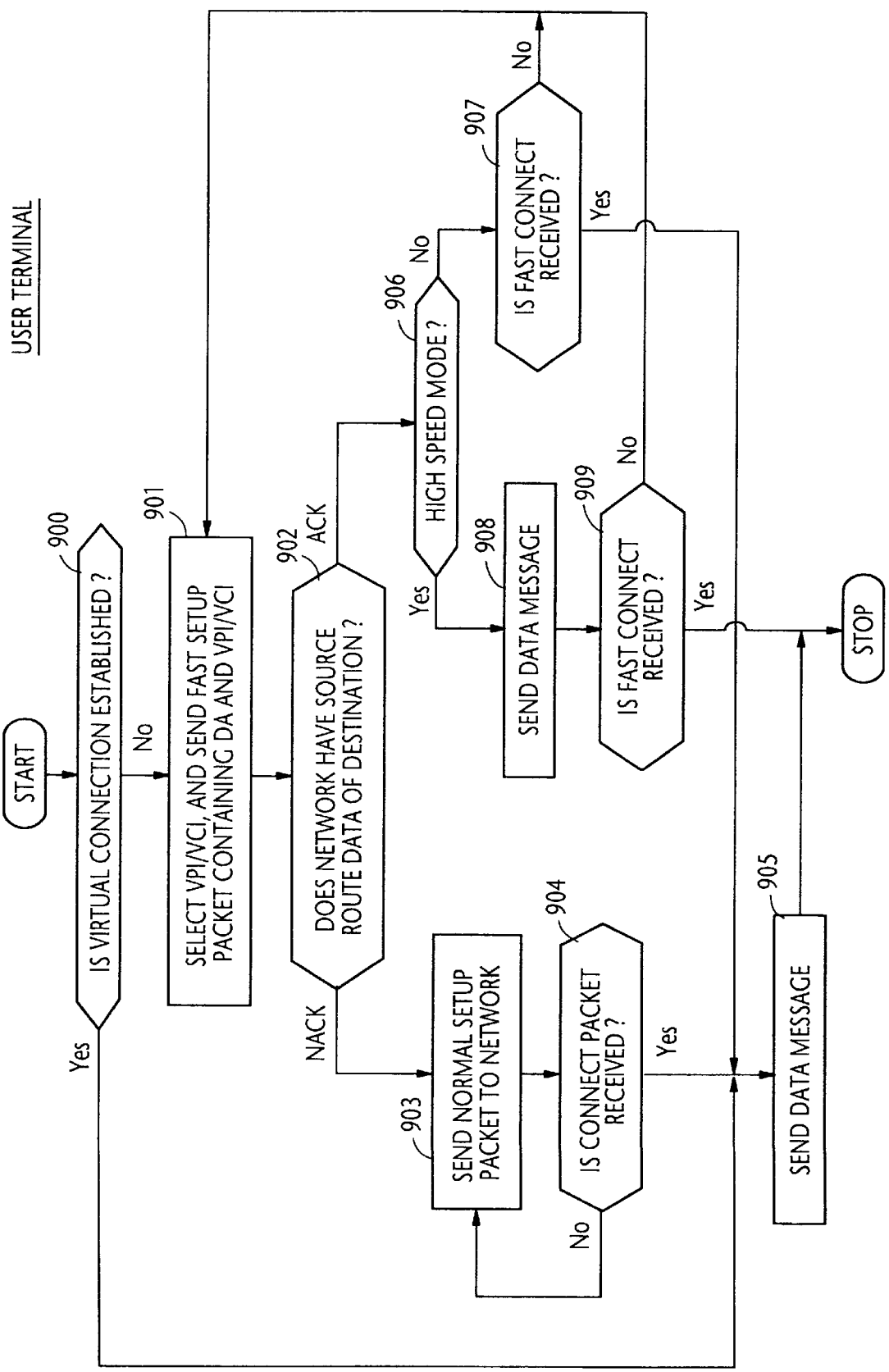
FIG. 9 is a flowchart of the operation of a user terminal of the third embodiment.
Figure 10:
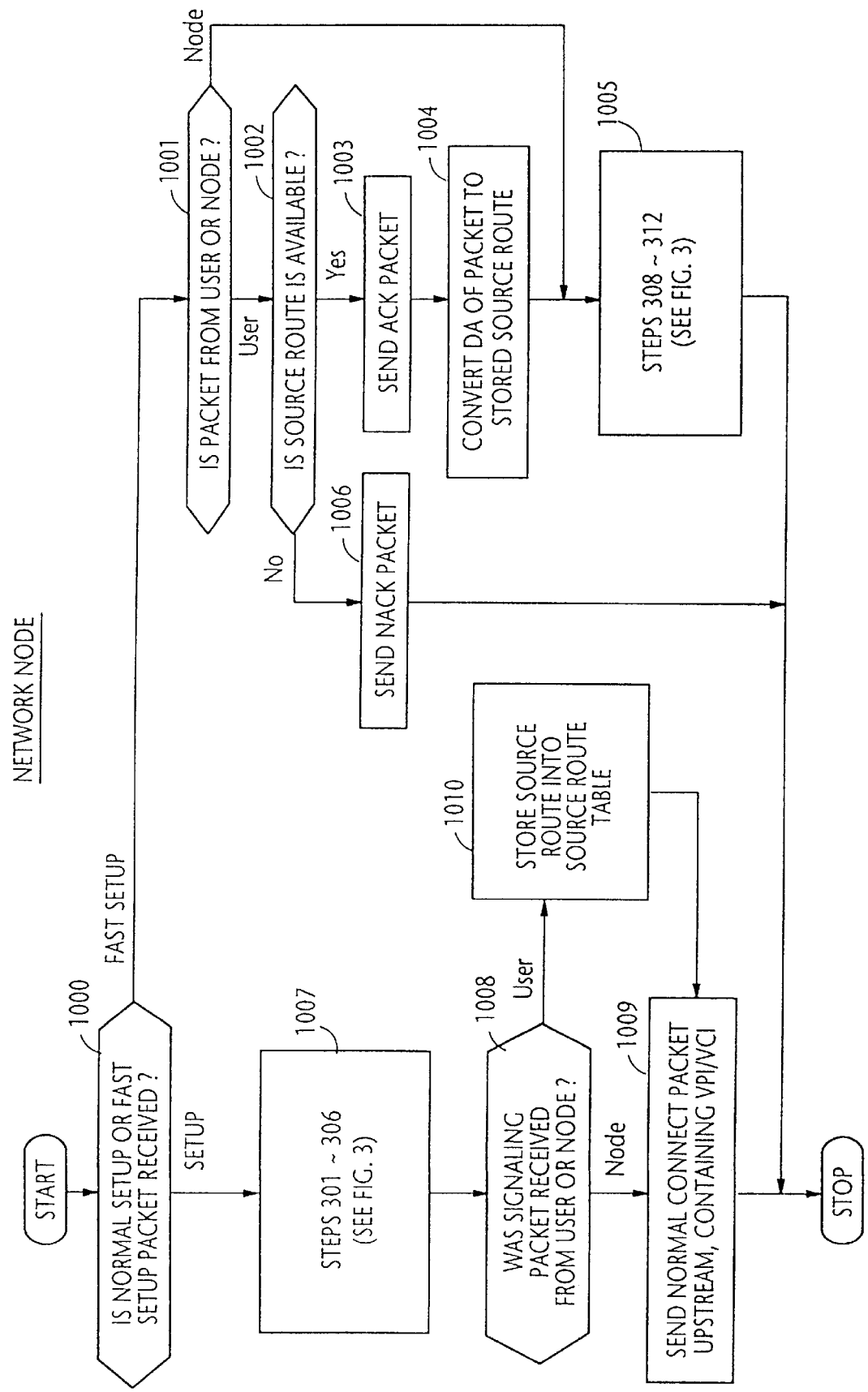
FIG. 10 is a flowchart of the operations of a network node of the third embodiment.

According to a third embodiment of the present invention, the source table is created at the entry point node of the network interfacing the source user terminal as illustrated in FIG. 8. In the illustrated embodiment, node 110 is the entry point node, where a source route table 800 is created by mapping destination addresses and corresponding source routes. As in the previous embodiment, the contents of each entry are erased by a timer 801 following the expiration of time-out period. As shown in FIG. 9, the operation of the source user terminal begins with step 900. If no virtual connection is established, control exits to step 901 to select a VPI/VCI and send a FAST SETUP packet to the network, containing a destination address and the selected VPI/VCI. At step 902, the source user determines whether an affirmative acknowledgment (ACK) packet is returned from the network, indicating that the network (entry point node) has a source route data for the destination or whether a negative acknowledgment (NACK) packet is returned indicating that the network has no source route for the destination. If a NACK packet is received, control branches at step 902 to step 903 to send a normal SETUP packet to the network and awaits the return of a normal CONNECT packet from the destination (step 904). If an ACK packet is received, control exits to step 906. If the source user terminal is not in a high speed mode, it simply waits for a FAST CONNECT packet from the destination (step 907) before sending a data message (step 905). If the source user is in a high speed mode, a data message is sent immediately in response to the ACK packet (step 908) to confirm reception of a FAST CONNECT packet (step 909). If it fails to receive a confirmation (steps 907 and 908), control returns to step 901 to repeat the process.

The network begins operating at step 1000 which determines the type of signaling packet it received. If the received packet is a FAST SETUP packet, control branches at step 1000 to step 1001 to check to see if the packet is received directly from a user or an upstream node. If the packet is from a user terminal, control exits to decision step 1002 to search through the source route table 800 and determines whether a source route is available for the destination address contained in the packet. If the answer is affirmative, an ACK packet is sent to the user (step 1003) and the destination address of the packet is converted to the source route (step 1004). Step 1004 is followed by subroutine 1005 comprising steps 308 to 312 of FIG. 3. By executing subroutine 1005, the destination-converted source route in the received signaling packet is carried by each subsequent node to the destination.

If the decision at step 1002 is negative, a NACK packet is sent to the requesting user (step 1006). If the FAST SETUP packet is from a node, control branches at step 1001 to subroutine 1005, skipping steps 1002 to 1004.

When a normal SETUP packet is received, control branches at step 1000 to subroutine 1007 which comprises steps 301 to 306 of FIG. 3 to send a normal SETUP packet and receive a normal CONNECT packet. Exit then is to step 1008 to check to see if the normal signaling packet that was received at step 1000 is one directly received from user or node. If the signaling packet was from a node, control proceeds to step 1009 to send a normal CONNECT packet upstream, containing VPI/VCI. If the normal signaling packet of step 1000 was from a user, the source route contained in the received CONNECT packet is stored into the source route table 800 at step 1010 and control exits to step 1009.

Figure 11:
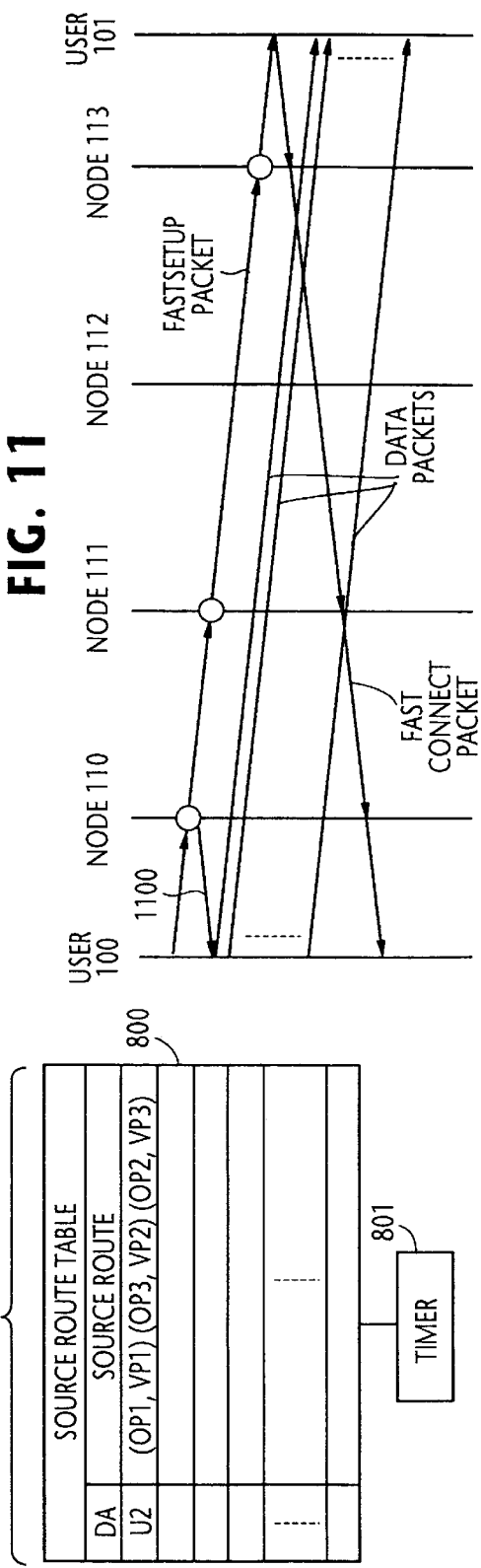
FIG. 11 is a diagram useful for describing the operation of the third embodiment.

Therefore, the source user is allowed to send a data message at the instant it received an ACK packet during the high speed mode (step 908). As shown in FIG. 11, the source user terminal 100 will receive an ACK packet 1100 from node 110 immediately following the transmission of a FAST SETUP packet, data message transmission can be started very quickly.

By the provision of a source route table at an entry point node of the network, the source route table can be advantageously shared by a group of users that are serviced by the node. In addition, if an alteration is made in the source route of a destination address, the entry point node can quickly respond to it by making changes in the corresponding entry of the source route table.

Figure 12:
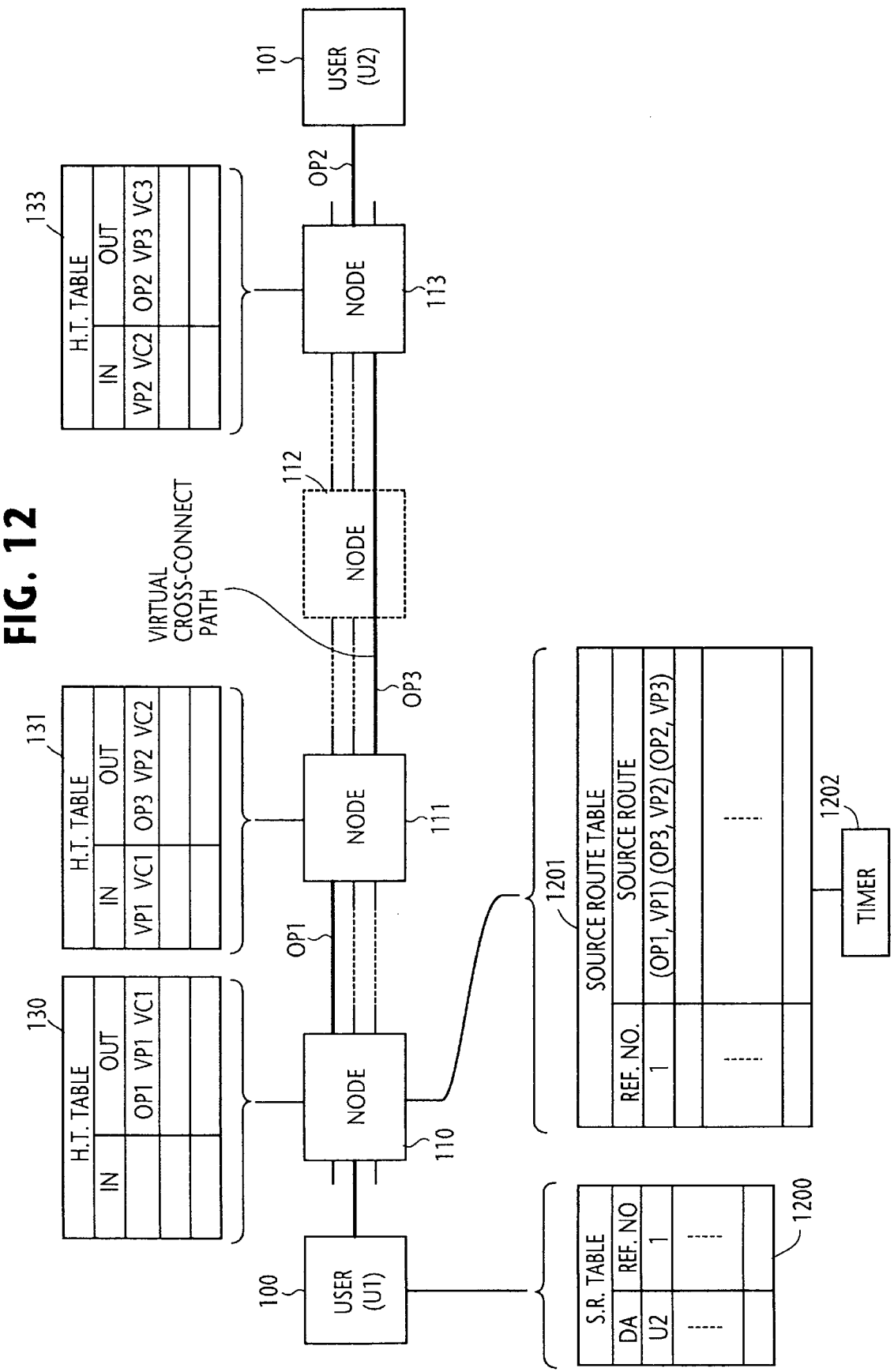
FIG. 12 is a block diagram of an ATM network according to a fourth embodiment of the present invention.
Figure 13:
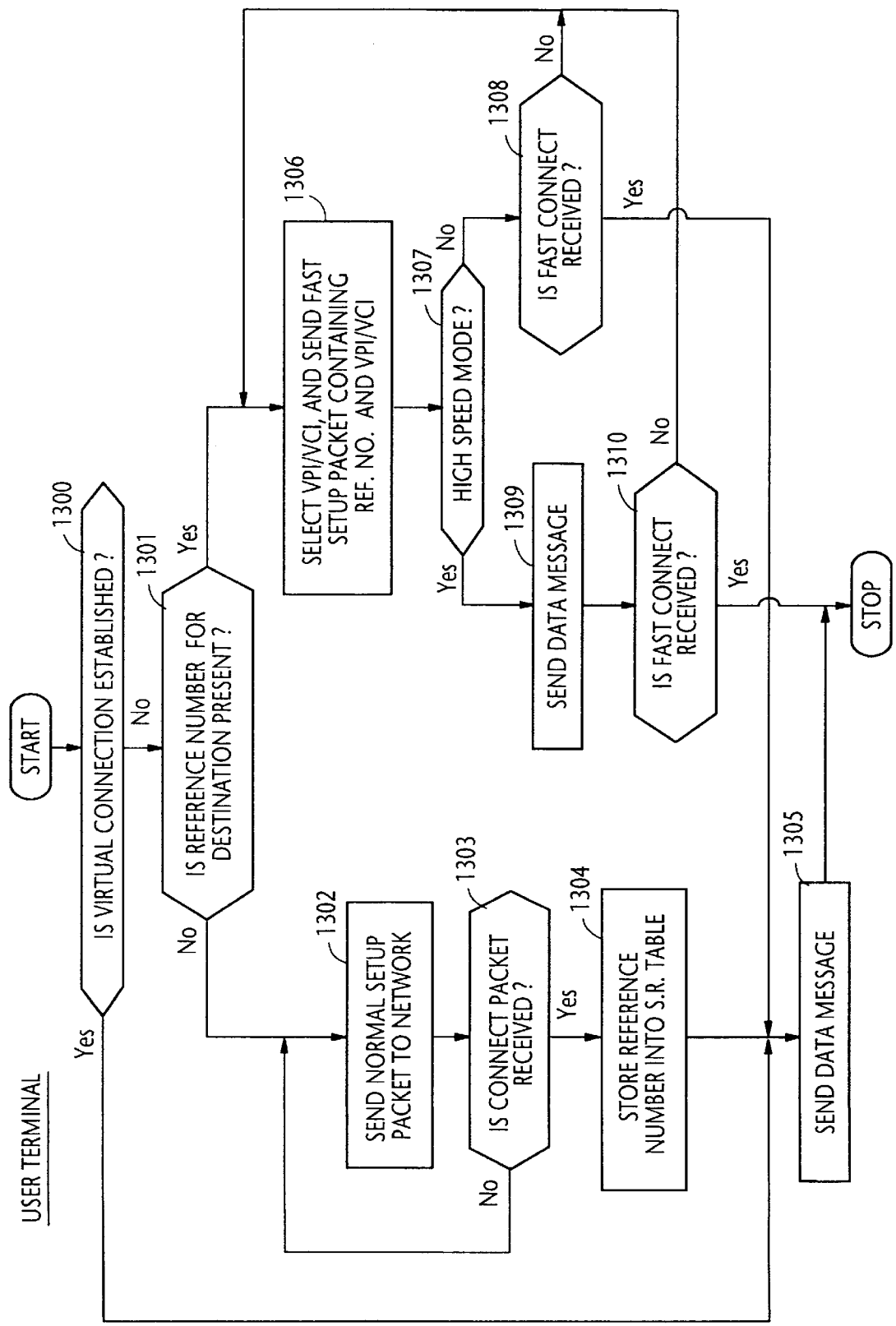
FIG. 13 is a flowchart of the operation of a user terminal of the fourth embodiment.
Figure 14:
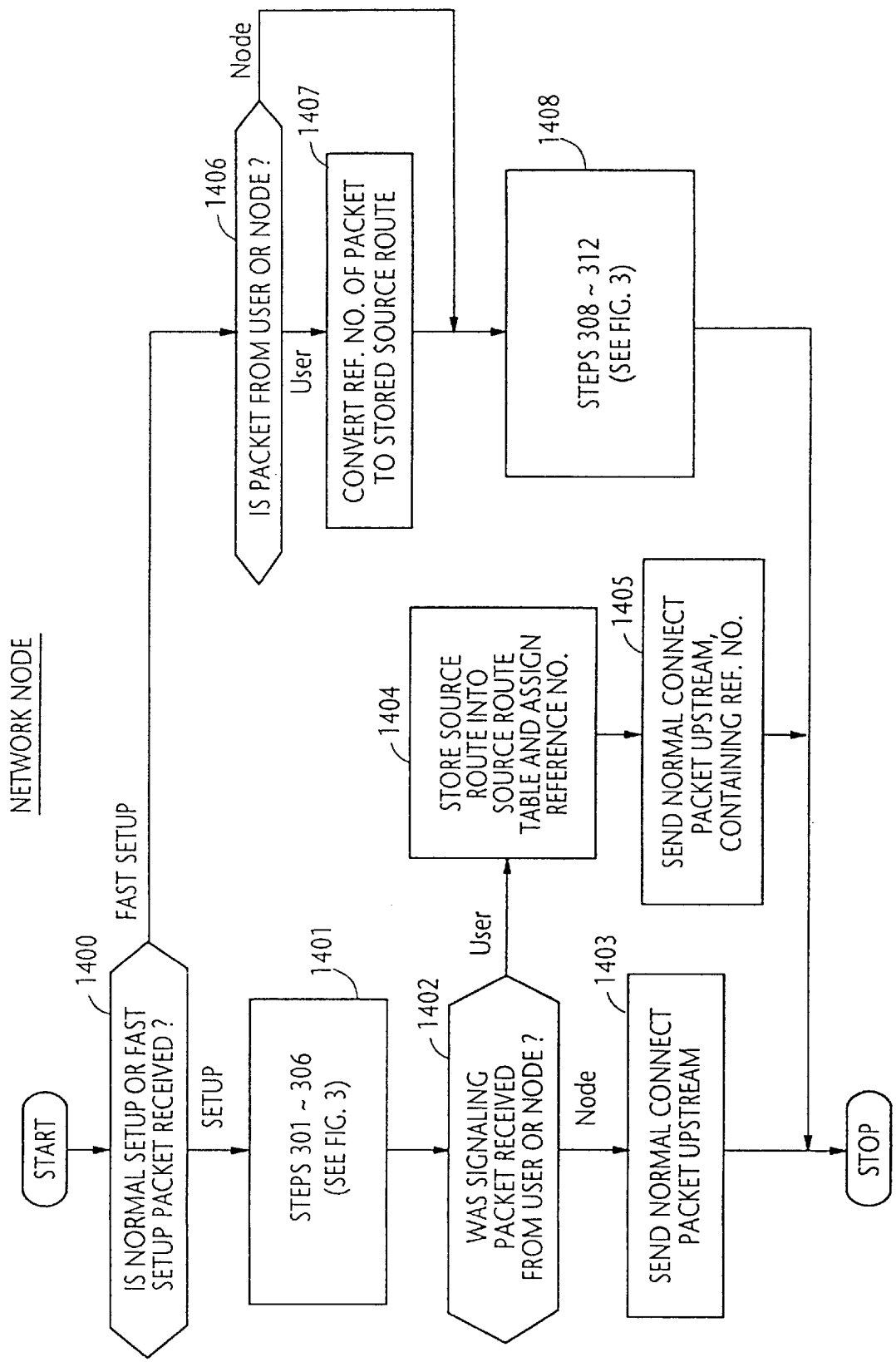
FIG. 14 is a flowchart of the operations of a network node of the fourth embodiment of this invention.

A fourth embodiment of the present invention is shown in FIGS. 12, 13 and 14, which is a modification of the third embodiment. In this modification, source route tables are created both at source user terminal and entry point node, and the source route data of each destination is assigned a locally unique reference number. As shown in FIG. 12, the source user terminal 100 and the entry point node 110 have the ability to create source route tables 1200 and 1201. The time lapse of each entry of the source route table 1201 is monitored by timer 1202 in the same manner as in the previous embodiments. The source route table 1200 defines a map between destination addresses and corresponding reference numbers, and the source route table 1201 defines a map between reference numbers and source routes comprising a series of output port numbers and VPIs.

In FIG. 13, the user terminal begins operation at step 1300 to check to see if a virtual connection is established. If not, control exits to step 1301 to search through its source route table for a reference number corresponding to the desired destination. If the answer is negative, control branches at step 1301 to step 1302 to send a normal SETUP packet to the network. If a normal CONNECT packet is not received (step 1303), the normal SETUP packet will be retransmitted (step 1302). If it is received, control exits to step 1304 to store the reference number carried by the received normal CON- NECT packet into the source route table 1200 and sends a data message (step 1305).

If the decision at step 1301 is affirmative, VPI/VCI is selected and a FAST SETUP packet is sent to the network, containing the reference number detected in the source route table and the selected VPI/VCI (step 1306). At step 1307, the mode of operation is checked. If the source user terminal is in a low speed mode, a check is made at step 1308 to see if a FAST CONNECT packet is received. If not, steps 1306 and 1307 are repeated, and If not, a data message is sent (step 1305). If the user terminal is in a high speed mode, the data message is sent (step 1309) immediately following the transmission of the FAST SETUP packet to the network, and subsequently a check is made for confirming that a FAST CONNECT packet is received or not.

In FIG. 14, each of the network nodes begins operating at step 1400 which determines whether a received packet is a normal or FAST SETUP packet. If the signaling packet is of the normal type, control executes subroutine 1401 comprising steps 301 to 306 of FIG. 3 to send a normal SETUP packet and receive a normal CONNECT packet At subsequent step 1402, control checks to see if the normal signaling packet received at step 1400 is one directly received from user or node. If the signal packet was from a node, control advances to step 1403 to send a normal CONNECT packet upstream. If the normal signaling packet of step 1400 was from a user, the source route contained in the received CONNECT packet is stored into the source route table 1201 and a reference number is assigned to the stored source route (step 1404) and control exits to step 1405 to send a normal CONNECT packet upstream, containing the reference number.

If the signaling packet received at step 1400 is a FAST SETUP packet, control checks to see if this packet is from user or node at step 1406. If it is from user, the source route table 1201 is searched for the reference number contained in the received signaling packet and this reference number is converted to the corresponding source route data (step 1407). Control then executes subroutine 1408 comprising steps 308 to 312 of FIG. 3 to send the FAST SETUP packet downstream to receive a FAST CONNECT packet. If the signaling packet is from a node, control branches at step 1406 to subroutine 1408, skipping step 1407.

What is claimed is:

1. In a connection-oriented communications network including first and second user terminals and first and second interlinked network nodes, a method comprising the steps of:

a) sending a normal signaling packet from the first user terminal to the network, said normal signaling packet containing a destination address of the second user terminal;

b) receiving the normal signaling packet at the first network node, determining a first virtual path identifier (VPI) according to the destination address in the normal signaling packet, inserting the first VPI into the received normal signaling packet, and forwarding the normal signaling packet to the second network node;

c) receiving the normal signaling packet at the second network node, determining a second VPI according to the destination address in the normal signaling packet, adding the second VPI to the first VPI in the normal signaling packet to produce a source route, and forwarding the normal signaling packet to the second user terminal;

d) responsive to the normal signaling packet from the second network node, sending an acknowledgment packet from the second user terminal back to the first user terminal via said second and first network nodes, the acknowledgment packet containing said source route;

e) receiving the acknowledgment packet at said first user terminal and storing the source route contained therein into a source route table;

f) selecting, at the first user terminal, an initial VPI and an initial virtual channel identifier (VCI) from a copy of a network resource, sending a fast signaling packet from the first user terminal, the fast signaling packet containing the stored source route, and the initial VPI and the initial VCI;

g) receiving the fast signaling packet at the first network node, selecting a first VCI according to the first VPI in the source route of the packet, mapping the initial VPI and the initial VCI in the packet to the first VPI and the selected first VCI, rewriting the initial VCI in the packet with the first VCI, and forwarding the fast signaling packet to the second network node as a new fast signaling packet; and h) receiving the new fast signaling packet at the second network node, selecting a second VCI according to the second VPI in the source route of the packet, mapping the first VPI and the first VCI in the new fast signaling packet to the second VPI and the second VCI, rewriting the first VCI in the new fast signaling packet with the second VCI, and forwarding the new fast signaling packet to the second user terminal.

2. A method as claimed in claim 1, wherein the step (f) further comprises the step of sending a data message immediately following the sending of said fast signaling packet from the first user terminal.

3. In a connection-oriented communications network including first and second user terminals and first and second interlinked network nodes, a method comprising the steps of:

a) sending a normal signaling packet from the first user terminal to the network, said normal signaling packet containing a destination address of the second user terminal;

b) receiving the normal signaling packet at the first network node, determining a first virtual path identifier (VPI) according to the destination address in the normal signaling packet, assigning a first reference number to the first VPI, inserting the first reference number into the received normal signaling packet, and forwarding the normal signaling packet to the second network node;

c) receiving the normal signaling packet at the second network node, determining a second VPI according to the destination address in the normal signaling packet, assigning a second reference number to the second VPI, adding the second reference number to the first reference number in the normal signaling packet to produce a source route, and forwarding the normal signaling packet to the second user terminal;

d) responsive to the normal signaling packet from the second network node, sending an acknowledgment packet from the second user terminal back to the first user terminal via said second and first network nodes, the acknowledgment packet containing said source route;

e) receiving the acknowledgment packet at said first user terminal and storing the source route contained therein into a source route table;

f) selecting, at the first user terminal, an initial VPI and an initial virtual channel identifier (VCI) from a copy of a network resource, sending a fast signaling packet from the first user terminal, the fast signaling packet containing the stored source route, and the initial VPI and the initial VCI;

g) receiving the fast signaling packet at the first network node, translating the first reference number in the source route of the fast signaling packet to said first VPI, selecting a first VCI according to the translated first VPI, mapping the initial VPI and the initial VCI in the packet to the translated VPI and the selected first VCI, rewriting the initial VPI and the initial VCI in the fast signaling packet, with the first VPI and the first VCI, respectively, and forwarding the fast signaling packet to the second network node as a new fast signaling packet; and h) receiving the new fast signaling packet at the second network node, translating the second reference number in the source route of the new fast signaling packet to said second VPI, selecting a second VCI according to the translated second VPI, mapping the first VPI and the first VCI in the new fast signaling packet to the translated second VPI and the second VCI, rewriting the first VPI and the first VCI in the new fast signaling packet with the second VPI and the second VCI, respectively, and forwarding the new fast signaling packet to the second user terminal.

4. A method as claimed in claim 3, wherein the step (f) further comprises the step of sending a data message immediately following the sending of said fast signaling packet from the first user terminal.

5. In a connection-oriented communications network including first and second user terminals and first and second interlinked network nodes, a method comprising the steps of:

a) selecting, at the first user terminal, an initial virtual path identifier (VPI) and an initial virtual channel identifier (VCI) from a copy of a network resource, sending a fast signaling packet from the first user terminal, the fast signaling packet containing a destination address of the second user terminal and the initial VPI and the initial VCI;

b) receiving the fast signaling packet at the first network node and, if a source route corresponding to the destination address in the fast signaling packet is not present in a source route table, returning a negative acknowledgment packet to the first user terminal, and, if said corresponding source route is present in said source route table, selecting, at said first network node, a first VCI according to the first VPI in the source route of the fast signaling packet from the first user terminal, mapping the initial VPI and the initial VCI in the fast signaling packet to the first VPI and the selected first VCI, rewriting the initial VCI in the fast signaling packet with the first VCI, forwarding the fast signaling packet to the second network node as a new fast signaling packet, returning an affirmative acknowledgment packet to the first user terminal and sending a data message from the first user terminal to the network;

c) responsive to said negative acknowledgment packet, sending a first normal signaling packet from the first user terminal to the network, the first normal signaling packet containing said destination address;

d) receiving the first normal signaling packet at the first network node, determining a first VPI according to the destination address in the first normal signaling packet, inserting the first VPI into the received first normal signaling packet, and forwarding the first normal signaling packet to the second network node;

e) receiving the first normal signaling packet at the second network node, determining a second VPI according to the destination address in the first normal signaling packet, adding the second VPI to the first VPI in the first normal signaling packet to produce a source route, and forwarding the first normal signaling packet to the second user terminal;

f) responsive to said affirmative acknowledgment packet, sending a second normal signaling packet from the first user terminal to the network, sending a connection indicating packet from the second user terminal back to the first network node, the connection indicating packet containing said source route;

g) receiving the connection indicating packet at said first network node and storing the source route contained therein into said source route table, and returning the connection indicating packet to said first user terminal; and h) receiving the new fast signaling packet at the second network node, selecting a second VCI according to the second VPI in the source route of the new fast signaling packet, mapping the first VPI and the first VCI in the new fast signaling packet to the second VPI and the second VCI, rewriting the first VCI in the new fast signaling packet with the second VCI, and forwarding the new fast signaling packet to the second user terminal.

6. In a connection-oriented communications network including first and second user terminals and first and second interlinked network nodes, a method comprising the steps of:

a) determining whether a reference number corresponding to a destination address of the second user terminal is present in a first source route table;

b) if said reference number is not present, sending a normal signaling packet from the first user terminal to the network, said normal signaling packet containing a destination address of the second user terminal;

c) if said reference number is present, selecting an initial virtual path identifier (VPI) and an initial virtual channel identifier (VCI) from a copy of a network resource, sending a fast signaling packet from the first user terminal, the fast signaling packet containing the reference number, the initial VPI and the initial VCI;

d) receiving the normal signaling packet at the first network node, determining a first according to the destination address in the packet, inserting the first VPI into the received normal signaling packet, and forwarding the normal signaling packet to the second network node;

e) receiving the normal signaling packet at the second network node, determining a second VPI according to the destination address in the normal signaling packet, adding the second VPI to the first VPI in the normal signaling packet to produce a source route, and forwarding the normal signaling packet to the second user terminal;

f) responsive to the normal signaling packet from the second network node, sending an acknowledgment packet from the second user terminal back to the first network node via said second and first network nodes, the acknowledgment packet containing said source route;

g) receiving the acknowledgment packet at said first network node and storing the source route contained therein into a second source route table and assigning said reference number to the source route;

h) receiving, at the first network node, the fast signaling packet from the first user terminal, translating the reference number in the received fast signaling packet to said source route, selecting a first VCI according to the first VPI in the translated source route, mapping the initial VPI and the initial VCI in the packet to the first VPI and the selected first VCI, rewriting the initial VPI and the initial VCI in the fast signaling packet with the first VPI and the first VCI, respectively, inserting said source route in the fast signaling packet, and forwarding the fast signaling packet to the second network node as a new fast signaling packet; and i) receiving the new fast signaling packet at the second network node, selecting a second VCI according to the second VPI in the source route of the new fast signaling packet, mapping the first VPI and the first VCI in the new fast signaling packet to the second VPI and the second VCI, rewriting the first VPI and the first VCI in the new fast signaling packet with the second VPI and the second VCI, respectively, and forwarding the new fast signaling packet to the second user terminal.

7. A method as claimed in claim 6, further comprising the step of sending a data message from the first user terminal immediately following the transmission of said fast signaling packet therefrom.

8. A method of establishing a virtual connection for a message transfer in a connection-oriented communications network, each message transfer including a set up packet and at least one data packet, the method comprising the steps of:

creating, in a source user terminal, a series of node-by-node route records of a virtual connection previously established in a previous message transfer, from the source user terminal to a destination user terminal, the route records containing respective virtual path identifiers (VPIs) and respective outgoing port numbers (OPNs);

transmitting, to the network, a signaling packet containing the route records either from the source user terminal or from a source node of the network;

receiving the signaling packet at one of a plurality of nodes of the network;

reading a VPI and an OPN from one of the route records of the received signaling packet;

selecting a virtual channel identifier (VCI) from a set of VCIs belonging to the VPI;

mapping incoming routing information to outgoing routing information including the VPI, the VCI and the OPN; and forwarding the signaling packet to the network until the packet is received by the destination user terminal.

9. A connection-oriented communications network for a message transfer, each message transfer including a set up packet and at least one data packet, the network comprising:

a source user terminal including:
 a source route table,
 means for creating in the source route table a source route to a destination user terminal, the source route including a series of node-by-node route records of a virtual connection previously established in a previous message transfer, between the source user terminal and the destination user terminal, the route records containing respective virtual path identifiers (VPIs) and respective outgoing port numbers (OPNs),
 means for assembling a signaling packet containing the source route, and
 means for transmitting packets to the network; and a plurality of interlinked network nodes, each of the nodes including:
 means for receiving packets from the network,
 a translation table,
 means for processing a received signaling packet including means for reading a VPI and an OPN from a corresponding one of the route records of the received signaling packet, selecting a virtual channel identifier (VCI) from a set of VCIs belonging to the VPI, mapping incoming routing information to outgoing routing information comprising the VPI and the VCI in the translation table, and
 means for forwarding the signaling packet to the network to establish the virtual connection, wherein, following the establishment of the virtual connection, the network nodes of the virtual connection use the VPIs, the VCIs and the OPNs of the translation tables of the respective nodes for routing a data packet transmitted by the source user terminal.

10. A connection-oriented communications network comprising:

a source user terminal including:
 a source route table,
 means for creating in the source route table a source route to a destination user terminal, the source route including a series of node-by-node route records of a virtual connection previously established between the source user terminal and the destination user terminal, the route records containing respective virtual path identifiers (VPIs) and respective outgoing port numbers (OPNs),
 means for assembling a signaling packet containing the source route, and
 means for transmitting packets to the network; and a plurality of interlinked network nodes, each of the nodes including:
 means for receiving packets from the network,
 a translation table,
 means for processing a received signaling packet including means for reading a VPI and an OPN from a corresponding one of the route records of the received signaling packet, selecting a virtual channel identifier (VCI) from a set of VCIs belonging to the VPI, mapping incoming routing information to outgoing routing information comprising the VPI and the VCI in the translation table, and
 means for forwarding the signaling packet to the network to establish the virtual connection, wherein, following the establishment of the virtual connection, the network nodes of the virtual connection use the VPIs, the VCIs and the OPNs of the translation tables of the respective nodes for routing a data packet transmitted by the source user terminal, wherein, the signaling packet is a fast signaling packet, wherein said creating means of the source user terminal comprises means for transmitting a normal signaling packet containing a destination address to the network, wherein a plurality of nodes successively determine VPIs and OPNs from the destination address of the normal signaling packet and establish a virtual connection between the source and destination user terminals using the VPIs and the OPNs, wherein the destination user terminal is arranged to obtain the VPIs from the network and return an acknowledgement packet containing the VPIs and the OPNs, and wherein said creating means is responsive to the acknowledgement packet for storing the VPIs and the OPNs of the acknowledgement packet in the source route table as the route records.

11. A connection-oriented communication network as claimed in claim 10, wherein the fast signaling packet contains a hop count number pointing to one of the route records of the fast signaling packet, and wherein said reading means is arranged to read a VPI and an OPN from one of the route records pointed by the hop count number and said processing means further comprises means for subsequently incrementing the hop count number.

12. A connection-oriented communications network for a message transfer, each message transfer comprising a set up packet and at least one data packet, the network comprising:

a source user terminal including:
  a source route table,
  means for creating in the source route table a source route to a destination user terminal containing a series of reference numbers,
  means for assembling a signaling packet containing the series of reference numbers, and
  means for transmitting packets to the network; and a plurality of interlinked network nodes, each of the nodes including:
  means for receiving packets from the network,
  a translation table,
  means for creating in the translation table one of the plurality of node-by-node route records of a virtual connection previously established in a previous message transfer, between the source user terminal and the destination user terminal, the route records containing respective virtual path identifiers (VPIs) and respective outgoing port numbers (OPNs),
  means for processing a received signaling packet including means for translating a corresponding one of the reference numbers of the received signaling packet to a VPI and an OPN of said one of the route records of the translation table, selecting a virtual channel identifier (VCI) from a set of VCIs belonging to the VPI, and mapping, in the translation table, incoming routing information to outgoing routing information containing the VPI, the VCI and the OPN, and
  means for forwarding the signaling packet to the network to establish said virtual connection,
wherein, following the establishment of the virtual connection, the network nodes of the established virtual connection use the VPIs, the VCIs and the OPNs of the translation tables of the respective nodes for routing a data packet transmitted by the source user terminal.

13. A connection-oriented communications network comprising:

a source user terminal including:
  a source route table,
  means for creating in the source route table a source route to a destination user terminal containing a series of reference numbers,
  means for assembling a signaling packet containing the series of reference numbers, and
  means for transmitting packets to the network; and a plurality of interlinked network nodes, each of the nodes including:
  means for receiving packets from the network,
  a translation table,
  means for creating in the translation table one of the plurality of node-by-node route records of a virtual connection previously established between the source user terminal and the destination user terminal, the route records containing respective virtual path identifiers (VPIs) and respective outgoing port numbers (OPNs),
  means for processing a received signaling packet including means for translating a corresponding one of the reference numbers of the received signaling packet to a VPI and an OPN of said one of the route records of the translation table, selecting a virtual channel identifier (VCI) from a set of VCIs belonging to the VPI, and mapping, in the translation table, incoming routine information to outgoing routing information containing the VPI, the VCI and the OPN, and
  means for forwarding the signaling packet to the network to establish said virtual connection,
wherein, following the establishment of the virtual connection, the network nodes of the established virtual connection use the VPIs, the VCIs and the OPNs of the translation tables of the respective nodes for rout a data packet transmitted by the source user terminal,
wherein the signaling packet is a fast signaling packet,
wherein said creating means of the source user terminal comprises means for transmitting a normal signaling packet containing a destination address to the network;
wherein said creating means of said nodes comprise means for determining VPIs and OPNs from the destination address of the normal signaling packet, respectively assigning reference numbers to the VPIs and the OPNs and storing into the translation table the VPIs, the OPNs and the reference numbers and using the VPIs and the OPNs to establish a virtual connection between the source and destination user terminals,
wherein the destination user terminal is arranged to obtain the reference numbers from the network and return an acknowledgement packet containing the reference numbers, and
wherein said creating means of the source user terminal is responsive to the acknowledgement packet for storing the reference numbers of the acknowledgement packet into the source route table as the route records.

14. A connection-oriented communications network as claimed in claim 13, wherein the fast signaling packet contains a hop count number pointing to one of the route records of the fast signaling packet, and wherein said reading means is arranged to read the VPI from one of the route records pointed by the hop count number and said processing means further includes means for subsequently incrementing the hop count number.

15. A connection-oriented communications network for a message transfer, each message transfer comprising a set up packet and at least one data packet, the network comprising:

a source user terminal including:
  means for assembling a signaling packet containing a destination address, and
  means for transmitting packets to the network;

a plurality of interlinked network nodes including a source node of the interlinked nodes comprising:

means for receiving packets from the network,
a translation table,
a source route table,
means for creating in the source route table a source route to a destination user terminal, the source route including a series of node-by-node route records of a virtual connection previously established in a previous message transfer, between the source user terminal and the destination user terminal, the route records containing respective virtual path identifiers (VPIs) and respective outgoing port numbers (OPNs),
means for processing a received signaling packet including means for reading a VPI and an OPN from one of the route records of the received signaling packet corresponding to the destination address of the received signaling packet, selecting a virtual channel identifier (VCI) from a set of VCIs belonging to the read VPI, mapping incoming routing information to outgoing routing information containing the VPI, the VCI and the OPN in said translation table, and
means for forwarding the signaling packet to the network; and
an intermediate node of the interlinked nodes including:
means for receiving packets from the network,
a translation table,
means for processing a received signaling packet including means for reading a VPI and an OPN from a corresponding one of the route records of the received signaling packet, selecting a VCI from a set of VCIs belonging to the VPI, mapping incoming routing information to outgoing routing information containing the VPI, the VCI and the OPN in the translation table of the intermediate node, and
means for forwarding the signaling packet to the network to establish said virtual connection,
wherein, following the establishment of the virtual connection, the network nodes of the established virtual connection use the VPIs, the VCIs and the OPNs of the translation tables of the respective nodes for routing a data packet transmitted by the source user terminal.

16. A connection-oriented communications network comprising:
a source user terminal including:
means for assembling a signaling packet containing a destination address, and
means for transmitting packets to the network;
a plurality of interlinked network nodes including a source node of the interlinked nodes comprising:
means for receiving packets from the network,
a translation table,
a source route table,
means for creating in the source route table a source route to a destination user terminal, the source route including a series of node-by-node route records of a virtual connection previously established between the source user terminal and the destination user terminal, the route records containing respective virtual path identifiers (VPIs) and respective outgoing port numbers (OPNs),
means for processing a received signaling packet including means for reading a VPI and an OPN from one of the route records of the received signaling packet corresponding to the destination address of the received signaling packet, selecting a virtual channel identifier (VCI) from a set of VCIs belonging to the read VPI, mapping incoming routing information to outgoing routing information containing the VPI, the VCI and the OPN in said translation table, and
means for forwarding the signaling packet to the network; and
an intermediate node of the interlinked nodes including;
means for receiving rackets from the network,
a translation table,
means for processing a received signaling packet including means for reading a VPI and an OPN from a corresponding one of the route records of the received signaling packet, selecting a VCI from a set of VCIs belonging to the VPI, mappings incoming routing information to outgoing routing information containing the VPI, the VCI and the OPN in the translation table, and
means for forwarding the signaling packet to the network to establish said virtual connection,
wherein, following the establishment of the virtual connection, the network nodes of the established virtual connection use the VPIs, the VCIs and the OPNs of the translation tables of the respective nodes for routing a data packet transmitted by the source user terminal,
wherein the signaling packet is a fast signaling packet,
wherein said creating means of the source node comprises means for transmitting a normal signaling packet containing a destination address to the network, and
wherein the plurality of nodes comprise means for determining respective VPIs and respective OPNs from the destination address of the normal signaling packet and using the respective VPIs and the respective OPNs to establish a virtual connection between the source and destination user terminals to thereby obtain a plurality of route records, assigning a reference number to the plurality of route records and storing the assigned reference number and the route records in the source route table.

17. A connection-oriented communications network as claimed in claim 16, wherein the fast signaling packet contains a hop count number pointing to one of the route records of the fast signaling packet, and wherein said processing means further comprises means for reading a VPI and an OPN from one of the route records pointed by the hop count number and subsequently incrementing the hop count number.

18. A connection-oriented communications network for a message transfer, each message transfer comprising a set up packet and at least one data packet, the network comprising:
a source user terminal including:
a first source route table,
means for creating in the first source route table a plurality of reference numbers as source routes to a plurality of destination user terminals,
means for assembling a signaling packet containing a destination address and one of the reference numbers, and
means for transmitting packets to the network;
a plurality of interlinked network nodes, a source node of the interlinked nodes including:
means for receiving packets from the source user terminal,
a translation table,
a second source route table,
means for creating in the second source table a plurality of source routes to the plurality of destination user terminals, each source route containing a series of node-by-node route records of a virtual connection previously established in a previous message transfer, between the source user terminal and one of the plurality of destination user terminals, the route records of each source route containing respective virtual path identifiers (VPIs) and respective outgoing port numbers (OPNs), means for processing a received signaling packet including means for translating the reference number of the received signaling packet to a source route of the second source route table, reading a VPI and an OPN from a corresponding one of the route records of the source route, selecting a virtual channel identifier (VCI) from a set of VCIs belonging to the VPI, and mapping, in the translation table, incoming routing information to outgoing routing information containing the VPI, the VCI and the OPN, and means for forwarding the signaling packet to the network; and an intermediate node of the interlinked nodes including:
means for receiving packets from the network,
a translation table,
means for processing the received signaling packet including means for reading a VPI from a corresponding one of the route records of the translated source route of the received signaling packet and selecting a VCI from a set of VCIs belonging to the read VPI, and mapping, in the translation table of the intermediate node, incoming routing information to outgoing routing information containing the VPI and the VCI, and
means for forwarding the signaling packet to the network to establish the virtual connection, wherein, following the establishment of the virtual connection, the network nodes of the established virtual connection use the VPIs, the VCIs and the OPNs of the translation tables of the respective nodes for routing a data packet transmitted by the source user terminal.

19. A connection-oriented communications network comprising:

a source user terminal including:
a first source route table,
means for creating in the first source route table a plurality of reference numbers as source routes to a plurality of destination user terminals,
means for assembling a signaling packet containing a destination address and one of the reference numbers, and
means for transmitting packets to the network;

a plurality of interlinked network nodes, a source node of the interlinked nodes including:
means for receiving packets from the source user terminal,
a translation table,
a second source route table,
means for creating in the second source table a plurality of source routes to the plurality of destination user terminals, each source route containing a series of node-by-node route records of a virtual connection previously established between the source user terminal and one of the plurality of destination user terminals, the route records of each source route containing respective virtual path identifiers (VPIs) and respective outgoing port numbers (OPNs),
means for processing a received signaling packet including means for translating the reference number of the received signaling packet to a source route of the second source route table, reading a VPI and an OPN from a corresponding one of the route records of the source route, selecting a virtual channel identifier (VCI) from a set of VCIs belonging to the VPI, and mapping, in the translation table, incoming routing information to outgoing routing information containing the VPI, the VCI and the OPN, and
means for forwarding the signaling packet to the network; and an intermediate node of the interlinked nodes including:
means for receiving packets from the network,
a translation table,
means for processing the received signaling packet including means for reading a VPI from a corresponding one of the route records of the translated source route of the received signaling packet and selecting a VCI from a set of VCIs belonging to the read VPI, and mapping, in the translation table, incoming routing information to outgoing routing information containing the VPI and the VCI, and
means for forwarding the signaling packet to the network to establish the virtual connection, wherein, following the establishment of the virtual connection, the network nodes of the established virtual connection use the VPIs, the VCIs and the OPNs of the translation tables of the respective nodes for routing a data packet transmitted by the source user terminal, wherein the signaling packet is a fast signaling packet, wherein said creating means of the source user terminal comprises means for transmitting a normal signaling packet containing a destination address to the network, wherein the plurality of network nodes comprise means for determining respective VPIs and respective OPNs from the destination address of the normal signaling packet, assigning respective reference numbers to the VPIs, and using the VPIs to establish a virtual connection between the source user terminal and one of the destination user terminals, wherein said creating means of the source node comprises means for obtaining the VPIs, the OPNs and the reference numbers from the network and storing the obtained VPIs and reference numbers into the second source route table as the route records, wherein said destination user terminal is arranged to obtain the reference numbers from the network and return an acknowledgement packet containing the reference numbers, and wherein said creating means of the source user terminal is responsive to the acknowledgement packet for storing the reference numbers of the acknowledgement packet into the first source route table.

20. A connection-oriented communications network as claimed in claim 19, wherein the fast signaling packet contains a hop count number pointing to one of the route records of the fast signaling packet, and wherein said reading means of each of the source and intermediate nodes is arranged to read a VPI and an OPN from one of the route records pointed by the hop count number and said processing means of each of the source and intermediate nodes further comprises means for subsequently incrementing the hop count number.

* * * * *